US008036187B2

(12) United States Patent  (10) Patent No.: US 8,036,187 B2
Beneviste  (45) Date of Patent: Oct. 11, 2011

(54) BROADCAST/MULTICAST DATA IN A WIRELESS NETWORK

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 885 days.

(21) Appl. No.: 11/494,836

(22) Filed: Jul. 28, 2006

(65) Prior Publication Data

US 2007/0025318 A1    Feb. 1, 2007

Related U.S. Application Data

(60) Provisional application No. 60/703,442, filed on Jul. 29, 2005, provisional application No. 60/704,904, filed on Aug. 3, 2005.

(51) Int. Cl.
*H04W 4/00* (2009.01)
*H04B 7/212* (2006.01)
*H04B 7/00* (2006.01)
*H04L 12/413* (2006.01)

(52) U.S. Cl. ..... 370/338; 370/347; 370/455; 370/310.2; 370/235; 370/328

(58) Field of Classification Search .................. 370/338, 370/347
See application file for complete search history.

(56) References Cited

U.S. PATENT DOCUMENTS

| 7,613,138 B2 * | 11/2009 | Bahl et al. ............... 370/310.2 |
| 2003/0207696 A1 * | 11/2003 | Willenegger et al. ....... 455/522 |
| 2004/0192320 A1 * | 9/2004 | Khawand et al. .......... 455/452.1 |
| 2005/0047359 A1 * | 3/2005 | Sebire ......................... 370/312 |
| 2005/0058151 A1 * | 3/2005 | Yeh ............................. 370/445 |
| 2005/0068922 A1 | 3/2005 | Jalali ........................... 370/335 |

FOREIGN PATENT DOCUMENTS

| GB | EP 1 150 462 A1 | 10/2001 |
| WO | WO 2004/019634 A1 | 3/2004 |
| WO | WO 2005/020520 A2 | 3/2005 |

OTHER PUBLICATIONS

European search report from related EP Application No. 06253957. 2-1525, total pp. 3.

* cited by examiner

*Primary Examiner* — Rafael Pérez-Gutiérrez
*Assistant Examiner* — Timothy Pham
(74) *Attorney, Agent, or Firm* — Chapin IP Law, LLC; David W. Rouille, Esq.

(57) ABSTRACT

A method, apparatus and computer program product for transmitting broadcast/multicast data in a wireless network, is presented. The network includes either a plurality of multi-radio nodes, or a plurality of single-radio nodes, or a mix of multi-radio and single-radio nodes and the network further includes a control channel and at least one data channel. Transmission of the broadcast/multicast data occurs either on the control channel or on a data channel.

23 Claims, 21 Drawing Sheets

BROADCAST/MULTICAST DATA IN A WIRELESS NETWORK

CROSS REFERENCE TO RELATED APPLICATIONS

The present application claims the benefit of U.S. Provisional Patent Application No. 60/703,442, filed on Jul. 29, 2005 and U.S. Provisional Patent Application No. 60/704,904, filed on Aug. 3, 2005, which are incorporated herein by reference.

BACKGROUND

Growth in demand for WLANs is driving the development of new technology to provide higher throughput. To a greater extent this growth is due to the increased number of users and applications desiring wireless transmission and to a lesser extent to the emergence of new applications needing higher transmission rates along a single connection between two points. The former requires higher aggregate throughput. The latter requires increased link throughput. The present application relates to MAC-based approaches for increasing aggregate throughput of a wireless network (i.e. a WLAN or a wireless mesh network) by enabling the simultaneous transmission on multiple channels, and specifically with the way broadcast and multicast data can be transmitted.

The MAC protocol distinguishes between two logical channel functions, the Control Channel (CC) and the Data Channel (DC). Stations exchange control and management frames on the control channel. The data channels carry data traffic. Reservations for transmission on the various data channels are made by exchanging control frames on the control channel. This control channel is used by each node for time reservations on data channel(s) and for acknowledgements. The control channel does not change dynamically (fast).

Data channel(s) are the channels used by nodes to transmit data traffic. Each node may transmit always on the same data channel(s), or it may select a channel to transmit on demand (dynamic channel assignment).

As extensions of the legacy RTS and CTS messages, the CC-RTS and CC-CTS are used to reserve a data channel for the time it takes to transmit a Transmission Opportunity (TXOP). A TXOP (transmit opportunity) is a sequence of frames transmitted between a pair of nodes following a single contention for the channel. A Source node is the node initiating the TXOP, and the Destination node is the node receiving the TXOP. Data traffic can be transmitted only on a data channel that is idle. The particular data channel selected for transmission of the TXOP is indicated in a special field on the CC-RTS/CC-CTS.

A CC-RTS frame is the frame used by a node initiating a TXOP. A CC-CTS frame is used by a node accepting a TXOP. If acknowledgement of receipt of transmission is desired, it can be sent either on the data channel or on the control channel. An acknowledgement on the control channel, known as the CC-ACK, identifies the individual frame in a sequence of frames that were received successfully (similar to 802.11e Group Ack).

A node with frames to transmit to a neighbor sets its data radio to transmit on a permissible data channel, sends a CC-RTS on the control channel to the destination node, and waits for a CC-CTS, which contains the acceptance or denial of the channel reservation request for the selected/assigned data channel.

If the destination node receives the CC-RTS, it sends a CC-CTS. The CC-CTS will contain a zero in the Reservation Duration field if the destination node does not accept the reservation request in the CC-RTS. A CC-CTS is not sent if the Reservation Duration field or the Number of Frames field contains a zero in the CC-RTS.

If the destination node accepts the reservation request in the CC-RTS, the destination node sets a data radio to receive on the data channel assigned/selected by the source node. If the destination node receives the same CC-RTS in the SIFS plus tx time, it sends another CC-CTS and waits for a time interval equal to SIFS plus CC-CTS tx duration. If the CC-CTS has not arrived at the source node by the expiration of SIFS plus CC-RTS tx duration plus CC-CTS tx duration, it transmits within SIFS another CC-RTS on the control channel.

If the CC-CTS is received within a time interval comprising the SIFS plus the CC-RTS tx duration plus the CC-CTS tx duration by the source node, and the Reservation Duration field has a zero value, the source node sends a CC-RTS to the destination node with the Reservation Duration field set to zero. If the CC-CTS is received within a time interval equal to the SIFS plus the CC-RTS tx duration plus the CC-CTS tx duration by the source node, and the Reservation Duration field has been changed to a longer value, the source node sends a CC-RTS to the destination node with the Number of frames set to zero. If the CC-CTS has arrived within the time interval equal to the SIFS plus the CC-RTS tx duration plus the CC-CTS tx duration at the source node, and the Reservation Duration field has a non-zero value, the source node transmits the frame(s) in the TXOP.

The CC-RTS/CC-CTS exchange may be defined so that it can reserve multiple data channels, or the control channel and one or more data channels, for the same time interval. The CCC protocol can be expanded to allow for several channels to be reserved at once for the communication between two nodes. For instance, the sending node may reserve a data channel and the control channel for the transmission data. The data may be split into two streams to be transmitted simultaneously to the destination node one two independent radios. This would double the data rate between two nodes. In this scenario, the node needs two radios. Alternatively, two data channels may be reserved at once by the transmitting node. The two channels may be adjacent and a single broader bandwidth radio would be used to transmit and receive. If the two channels are not adjacent, two independent data radios would each transmit a portion of the data.

Two multi-channel MAC protocols are examined. One protocol requires at least two radios per device: one radio, the 'control radio', is dedicated to the control channel, and the remaining radios, called 'data radios', are tuned to data channels. Whereas the control radio may be used for control and data traffic, only data traffic may be sent through the data radio(s). We refer to this protocol as the 'multi-radio protocol'. The nodes in a wireless network employing a multi-radio protocol are referred to as 'multi-radio nodes'.

The second protocol does not require a node to have a dedicated control radio. The same radio is switched between control and data channels. The nodes in a wireless network employing a single-radio protocol are referred to as 'single-radio nodes'.

When both single-radio and multi-radio nodes comprise a wireless network, referred to as a 'mixed network', additional measures are taken to allow for the co-existence of the two types of nodes, as described in co-pending patent application attorney docket number AVA06-36 filed Jul. 26, 2006, the disclosure of which is incorporated by reference in it's entirety.

With the multi-radio protocol, each node maintains a channel-specific NAV to avoid collisions. The NAV tracks the length of time for which a control or data channel is reserved. The NAV is the time period the node must refrain from transmitting on the channel, and is updated when a node receives a reservation request or a response to the reservation request. The NAV of a data channel is based on the value of the Reservation Duration field of the CC-RTS/CC-CTS. NAV-setting frames received on the data channels also update the data channel NAVs.

With a single-radio protocol, it is not possible to maintain NAV solely based on the NAV setting frames received on the control and data channels because there is no dedicated radio on the control channel. To make up for the lost NAV information, requirements to release all channels periodically force the NAV of all channels (either implicitly or explicitly) to be reset to zero. For the same reason, the control channel and any data channels shared by both single-radio and multi-radio nodes must be released periodically in a mixed network.

SUMMARY

This invention addresses the problem of sending broadcast/multicast data to a collection of nodes in a wireless network employing a multi-channel protocol. With wireless LANs that access a single channel, broadcast and multicast data are simply sent on that channel. Under a multi-channel MAC protocol, different options and limitations exist. With a multi-radio protocol, broadcast/multicast data may be sent on both the control channel and a data channel. With a single-radio protocol special precautions must be taken to ensure that all nodes will receive the broadcast/multicast data.

Embodiments of the invention provide mechanisms and techniques that provide a method and apparatus for efficiently transmitting broadcast/multicast data in a wireless network.

In one particular embodiment of a method of transmitting broadcast/multicast data in a wireless network, the wireless network includes a plurality of multi-radio nodes, and the network further includes a control channel and at least one data channel. The method includes tuning one radio of each of the multi-radio nodes to the control channel, and transmitting the broadcast/multicast data to a plurality of nodes on the control channel.

In another embodiment of a method of transmitting broadcast/multicast data in a wireless network, the wireless network includes a plurality of multi-radio nodes, and the network further includes a control channel and at least one data channel. The method includes tuning one radio of each of the multi-radio nodes to the control channel, selecting a data channel for broadcast/multicast data transmission, and transmitting the broadcast/multicast data on the selected data channel.

In another particular embodiment of a method of transmitting broadcast/multicast data in a wireless network, the wireless network having a control channel and at least one data channel, wherein the plurality of nodes includes at least one single-radio node. The method includes releasing, by all nodes of the network, the control channel and all the data channels accessible by single-radio nodes for a predetermined time at a start of a period. The method further includes tuning, by all nodes of the network, to the control channel for the predetermined time at the start of a period and assigning broadcast/multicast transmissions higher access priority; and thus transmitting broadcast/multicast data before unicast data can be transmitted on the control channel at the start of a period P. The method further includes assigning broadcast/multicast reservations higher access priority; and thus transmitting broadcast/multicast reservations before unicast reservations for data channels can be transmitted on the control channel at the start of a period P.

In another particular embodiment of a method of transmitting broadcast/multicast data in a wireless network, the network includes a plurality of multi-radio nodes and/or single-radio nodes, and the network further includes a control channel and at least one data channel that is accessible by both the single-radio and multi-radio nodes. The method includes releasing, by all nodes of the network, the control channel and the data channels accessible by the single-radio nodes at a predetermined time at a start of a period. The method further includes tuning, by all nodes of the network, to the control channel at a predetermined time at the start of a period. Additionally, the method includes setting a timer for a channel (NAV) which, if set, prevents the node from transmitting on the channel, at the predetermined time at a start of a period. The NAV of all data channels accessible by single-radio nodes is set to a constant value (CS) at the predetermined time at a start of a period, and the NAV of the control channel is set to zero at the predetermined time at a start of a period. The method also includes not permitting transmission of unicast data on the control channel for a specified window (BW) at the start of a period. Additionally, the method includes reserving a data channel for a broadcast/multicast transmission by assigning higher priority to the transmission on the control channel of the frames for such reservation than the reservation frames of unicast data, thus enabling the reservation information to be received by all single-radio nodes before tuning their radio to another channel. In a particular embodiment of this invention, prioritization of the reservation frames for a broadcast/multicast transmission on a data channel is achieved by the method described in co-pending patent application attorney docket number AVA06-36 filed Jul. 26, 2006.

Other embodiments include a computer readable medium having computer readable code thereon for transmitting broadcast/multicast data in a wireless network including a plurality of multi-radio nodes, the wireless network having a control channel and at least one data channel. The computer readable medium includes instructions for tuning one radio of each of said multi-radio nodes to the control channel and instructions for transmitting broadcast/multicast data to a plurality of nodes on the control channel.

Another embodiment includes a computer readable medium having computer readable code thereon for transmitting broadcast/multicast data in a wireless network, the wireless network including a plurality of multi-radio nodes, and the network further including a control channel and at least one data channel. The computer readable medium includes instructions for tuning one radio of each of the multi-radio nodes to the control channel, instructions for selecting a data channel for broadcast/multicast data transmission, and instructions for transmitting the broadcast/multicast data on the selected data channel.

Another particular embodiment includes a computer readable medium having computer readable code thereon for transmitting broadcast/multicast data in a wireless network having a control channel and at least one data channel, wherein the plurality of nodes includes at least one single-radio node. The computer readable medium includes instructions for releasing, by all nodes of the network, the control channel and all the data channels accessible by single-radio nodes for a predetermined time at a start of a period. The computer readable medium further includes instructions for tuning, by all nodes of the network, to the control channel for the predetermined time at the start of a period and assigning broadcast/multicast transmissions higher access priority; and thus transmitting broadcast/multicast data before unicast data can be transmitted on the control channel at the start of a period P. The computer readable medium further includes instructions for assigning broadcast/multicast reservations higher access priority; and thus transmitting broadcast/multicast reservations before unicast reservations for data channels can be transmitted on the control channel at the start of a period P.

In another particular embodiment a computer readable medium having computer readable code thereon for of transmitting broadcast/multicast data in a wireless network, the network including a plurality of multi-radio nodes and/or single-radio nodes, and the network further including a control channel and at least one data channel that is accessible by both the single-radio and multi-radio nodes. The computer readable medium includes instructions for releasing, by all nodes of the network, the control channel and the data channels accessible by the single-radio nodes at a predetermined time at a start of a period. The computer readable medium further includes instructions for tuning, by all nodes of the network, to the control channel at a predetermined time at the start of a period. Additionally, the computer readable medium includes instructions for setting a timer for a channel (NAV) which, if set, prevents the node from transmitting on the channel, at the predetermined time at a start of a period. The NAV of all data channels accessible by single-radio nodes is set to a constant value (CS) at the predetermined time at a start of a period, and the NAV of the control channel is set to zero at the predetermined time at a start of a period. The computer readable medium also includes instructions for not permitting transmission of unicast data on the control channel for a specified window (BW) at the start of a period. Additionally, the computer readable medium includes instructions for reserving a data channel for a broadcast/multicast transmission by assigning higher priority to the transmission on the control channel of the frames for such reservation than the reservation frames of unicast data, thus enabling the reservation information to be received by all single-radio nodes before tuning their radio to another channel. In a particular embodiment of this invention, prioritization of the reservation frames for a broadcast/multicast transmission on a data channel is achieved by the method described in co-pending patent application attorney docket number AVA06-36 filed Jul. 26, 2006.

Still other embodiments include a node (a single-radio node or a multi-radio node), configured to process all the method operations disclosed herein as embodiments of the invention. In such embodiments, the node includes a memory system, a processor, communications interface in an interconnection mechanism connecting these components. The memory system is encoded with a process that provides transmitting broadcast/multicast data in a wireless network as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing transmitting broadcast/multicast data in a wireless network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method, apparatus and software for providing efficient transmission of broadcast/multicast data in a network with single-radio nodes, multi-radio nodes and a combination of single-radio nodes and multi-radio nodes is presented.

Broadcast/multicast data is data sent to several destinations that can be transmitted simultaneously, thereby leaving channels available for use by others. Broadcast data comprises data that is sent to all node of the network, whereas multicast traffic varies with respect to the recipient list and amount of traffic. Examples of broadcast data include change of control channel, probe request, notice of power down and the like. As stated above, multicast data is data directed to multiple recipients and examples include Internet radio/music, group gaming, corporate data distribution and the like. Broadcast/multicast data can be either short data or long data. Different rules apply to the transmission of different types of multicast, and these rules vary with the protocol.

In order to properly perform transmission of broadcast/multicast data, a control channel is required. The node transmitting broadcast/multicast data must be able to access a channel to transmit the data, and the nodes must be tuned to that channel when data is transmitted.

The common control channel provides a way for the transmitting and receiving nodes to coordinate when and what channel a multicast transmission occurs on. For multi-radio nodes, all nodes have a radio dedicated to the common control channel.

Figure 1:
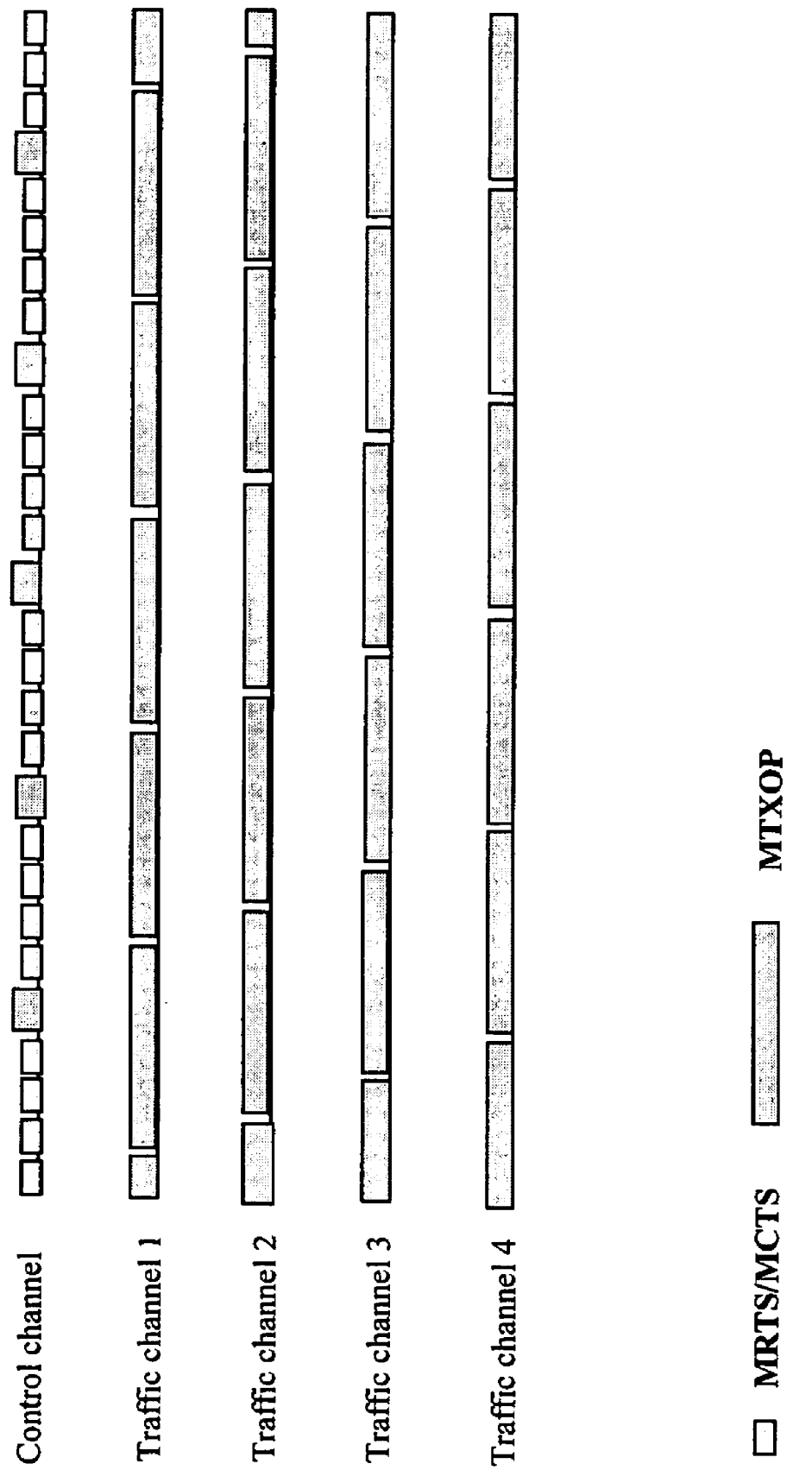
FIG. 1 shows a multi-radio network environment having unicast traffic.

Referring now to FIG. 1, a timing diagram including multi-radio nodes transmitting unicast data is shown. The timing diagram includes a control channel and four data traffic (MT) channels, designated traffic channels 1-4. The reservations for the unicast traffic (CC-RTS/CC-CTS) that occur on the control channel and allow for efficient use of the data channels is shown. Note that, for the unicast traffic there is very little wasted bandwidth, as the control channel and the data channels are nearly always being utilized at their maximum capacity.

Figure 2:
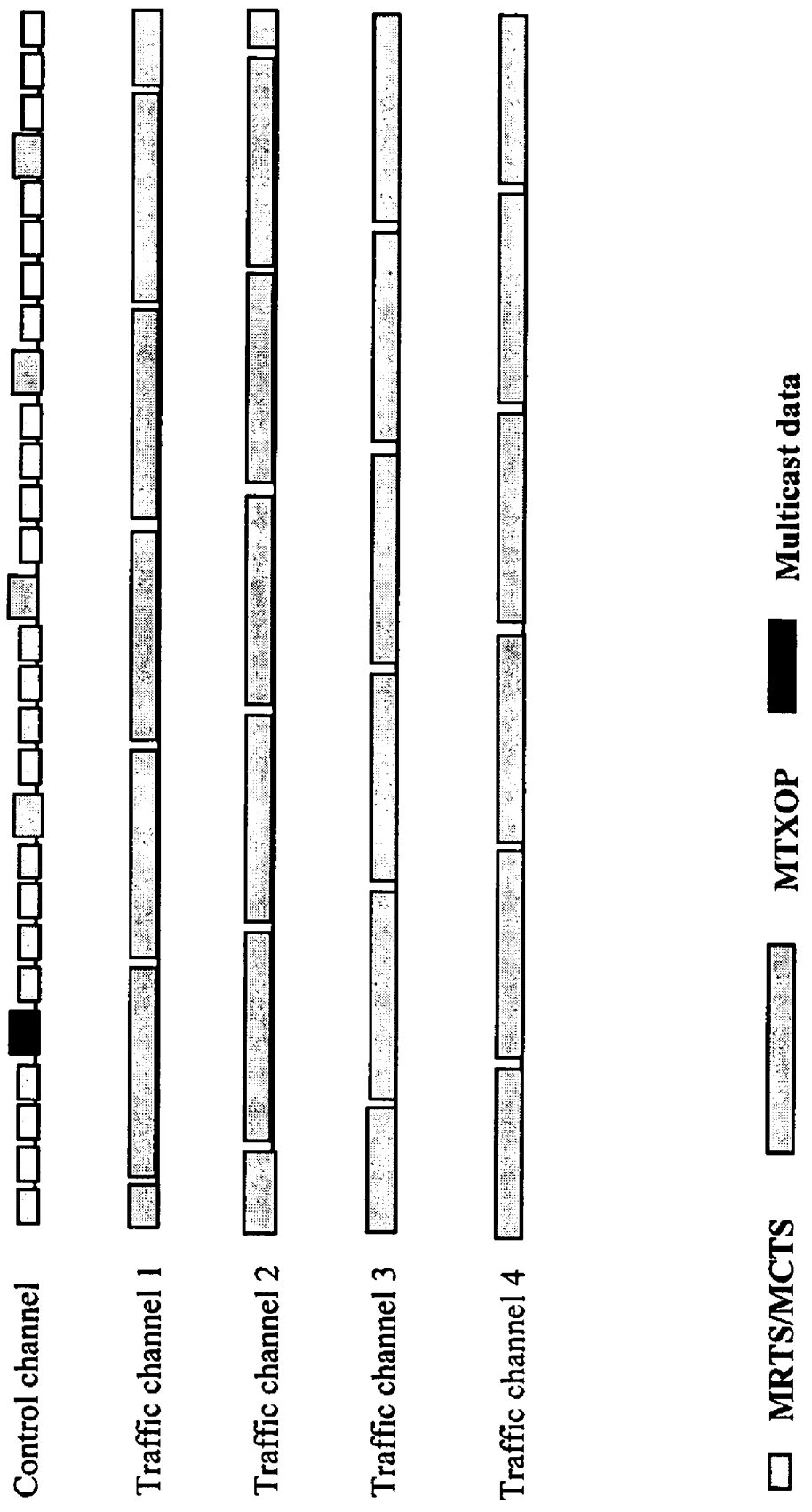
FIG. 2 shows a multi-radio network environment having short multicast traffic transmitted on the control channel.

For environments that utilize broadcast/multicast data, and which includes multi-radio nodes, all the nodes have at least two radios, with one of the radios dedicated to the common control channel. A reservation request is achieved with a CC-RTS addressed to a group, and no CC-CTS response is required. The destination address indicates either a group of nodes (multicast) or all the nodes associated with the network (broadcast), and no acknowledgement is required. Data (unicast/multicast/broadcast) can be transmitted on either traffic channels or the control channel. The choice of which channel to use for data transmission depends on MTXOP length. Transmission of long MTXOPs on the control channel reduces utilization of MT channels as reservations for MT channels cannot be made. Short frames can be transmitted on control channel without reservation, or with legacy RTS/CTS. FIG. 2 shows a timing diagram wherein a short broadcast of multicast data occurs on the control channel. The control radio is available to hear the broadcast/multicast data. All nodes have a radio dedicated to control channel. Short MTXOPs (e.g. network signaling) can be transmitted on control channel without reservation, or with legacy RTS/CTS. Since the broadcast is a short broadcast, there is little or no impact on the reservations of the traffic channels, and the use of the available bandwidth is efficient.

Figure 3:
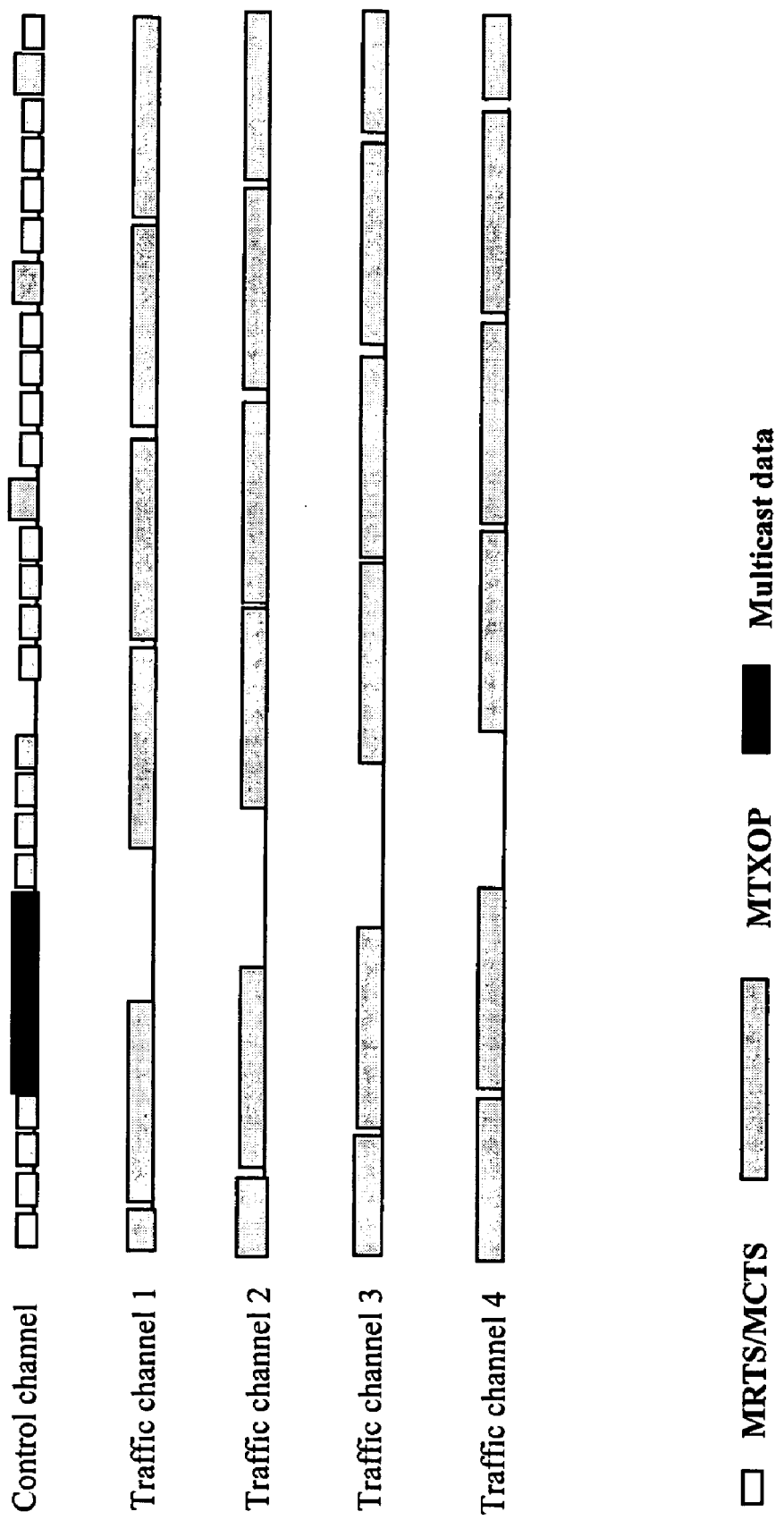
FIG. 3 shows a multi-radio network environment having long multicast traffic transmitted on the control channel.

Referring now to FIG. 3, transmission of long MTXOPs on the control channel reduces utilization of MT channels as reservations for MT channels cannot be made. As compared to FIG. 2, the utilization of the data channels is not as optimal, as the reservation of the channels has to wait until the multicast data transmission on the control channel completes. This reduces the efficiency of this type of operation as some amount of bandwidth is underutilized.

Figure 4:
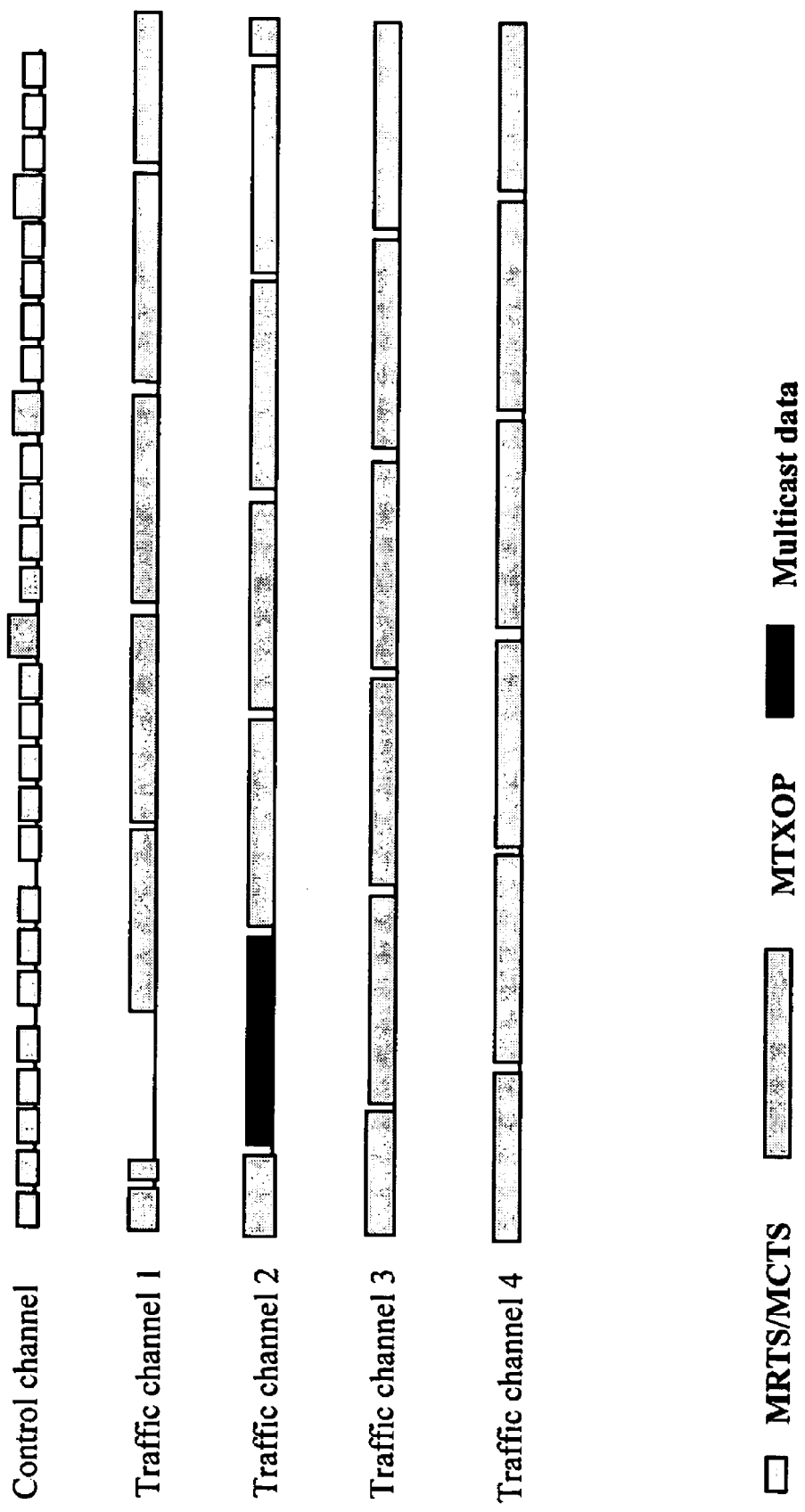
FIG. 4 shows a multi-radio network environment having long multicast traffic transmitted on a traffic channel.
Figure 5:
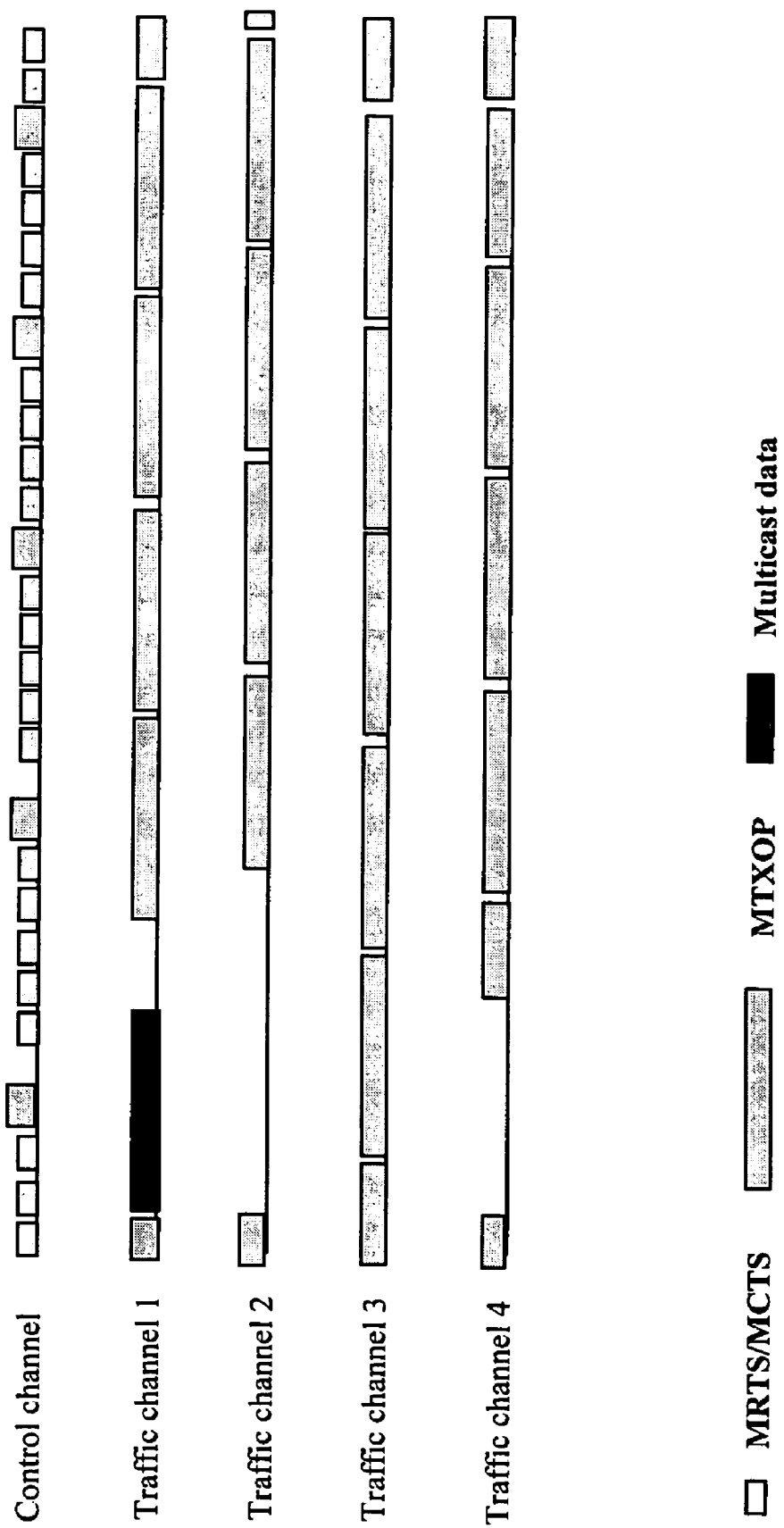
FIG. 5 shows a multi-radio network environment having long multicast traffic transmitted on a traffic channel.

Referring now to FIG. 4 and FIG. 5, transmission of long MTXOPs on a MT channel leaves the control channel available for transmissions or reservations for other MT channels. In FIG. 5, the node using traffic channel 3 has two data radios. To transmit long broadcast/multicast MTXOPs on a MT channel, all nodes involved in transmission must have a MT radio/channel free nodes that hear the reservation of a MT channel for a broadcast/multicast involving them tune a MT radio to the selected MT channel. If a MT radio is not available, a node that is involved in a broadcast/multicast abandons the MTXOP on a MT radio. To complete any interrupted MTXOPs, new reservations are made on the control channel when the broadcast/multicast completes. As can be seen by having long multicast data transmission take place on a data channel instead of the control channel the efficiency is improved, since there is no need to wait before additional reservations can be made on the control channel for data channels.

Table 1 shows the preferred channel to use for data transmission depending on the type of data, the number of radios at the nodes, and the length of the data transmission.

TABLE 1

| Distribution | # Radios | MTXOP Length | |
|---|---|---|---|
| | | Long | Short |
| Unicast | 2 or more | MT channel | Control channel |
| Broadcast/ multicast | Control channel | MT channel or Control | Control channel |

Figure 6:
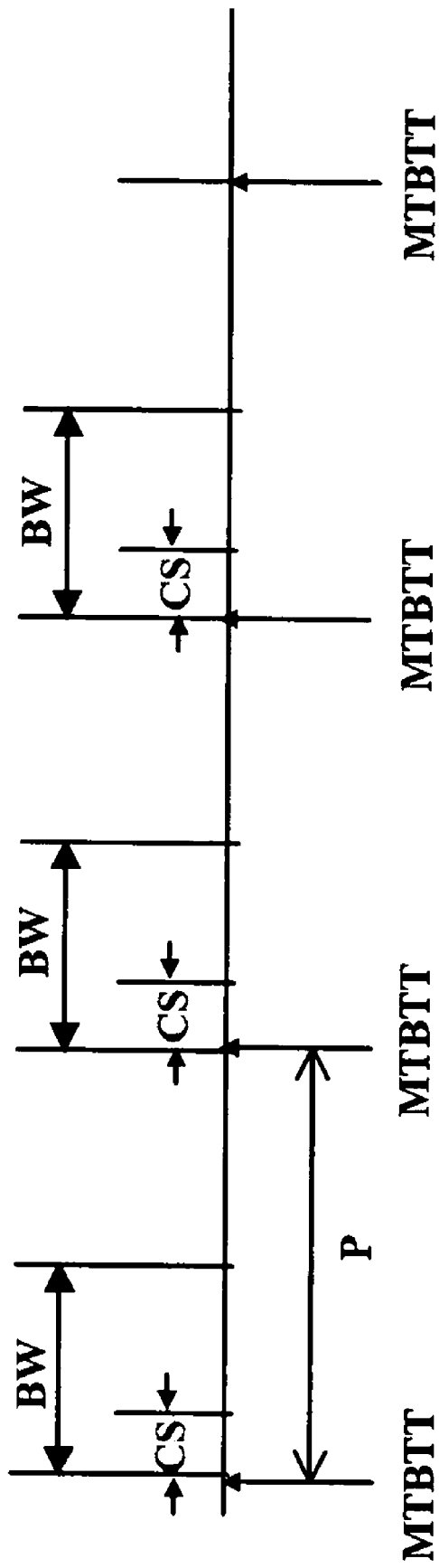
FIG. 6 shows a timing diagram of multiple periods for data transmission in a network.

A network may include only single-radio nodes, and may also be utilized for providing broadcast/multicast data transmission. For this type of environment all nodes release all channels at the start of a period, referred to as a multi-channel target beacon transmission times (MTBTT) and tune to the control channel. All transmissions must complete by next MTBTT. At MTBTT, each node sets NAVs of all data channels (DC) set to predetermined constant value (CS) and sets the NAV of the common control channel to zero. All pending multicast data at a node is placed in a MTXOP. FIG. 6 depicts a timing diagram showing periods (P) each having a start point (MTBTT). Each period also includes a CS time period and a BW time period, explained in more detail below.

Figure 7:
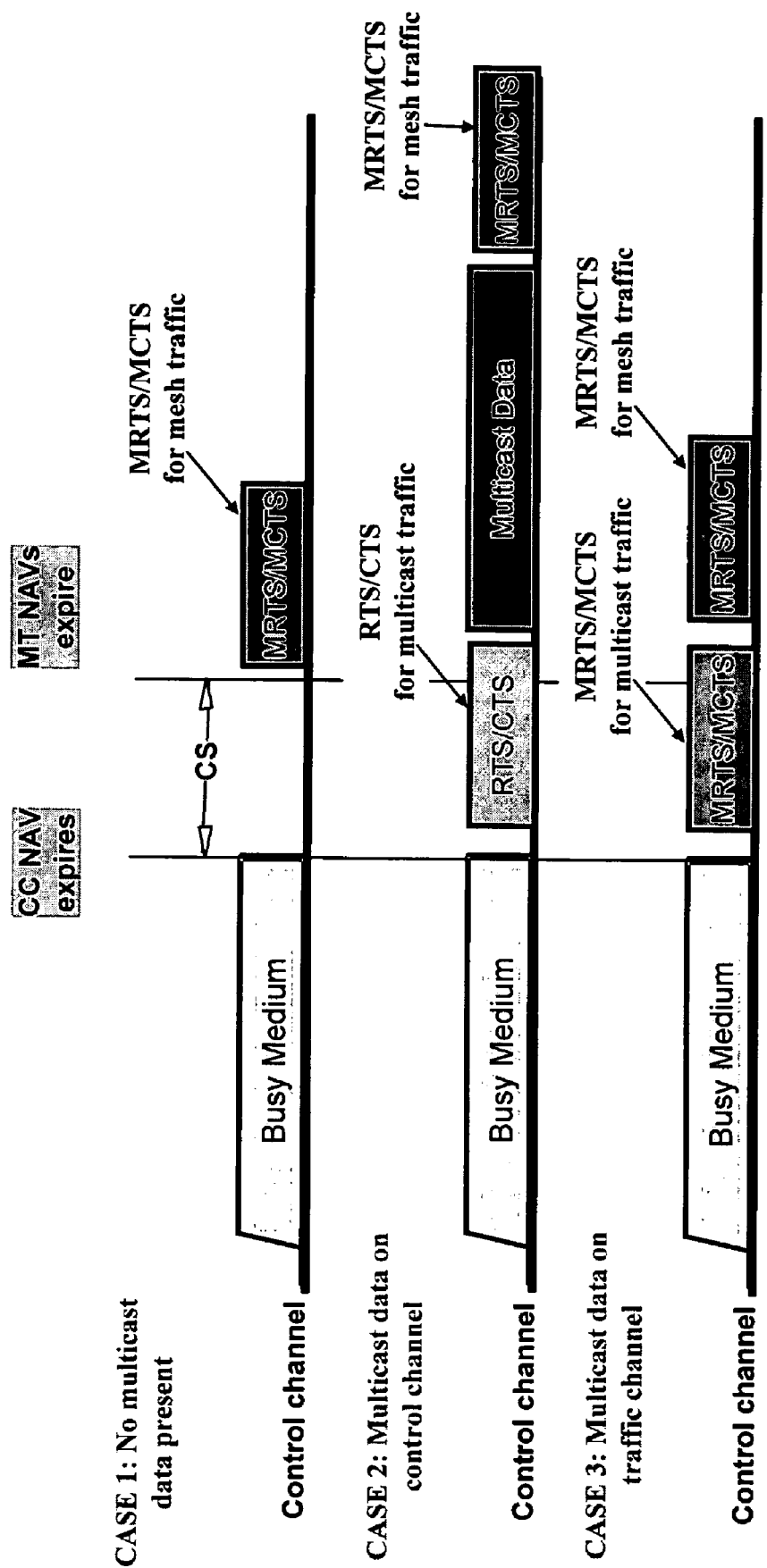
FIG. 7 shows a timing diagram for three different traffic.

A multicast MTXOP will be transmitted either on the control channel or on a MT channel. An node does not transmit a MTXOP containing data traffic on the control channel during a time period BW immediately following MTBTT. The multicast data MTXOP is transmitted first, before any reservations for MT channels can occur and before radios are retuned to MT channels. In a situation where there is no multicast data, CC-RTS/CC-CTS reservations for data traffic transmission start at CS following MTBTT. This is shown in the three scenarios depicted in FIG. 7.

Figure 8:
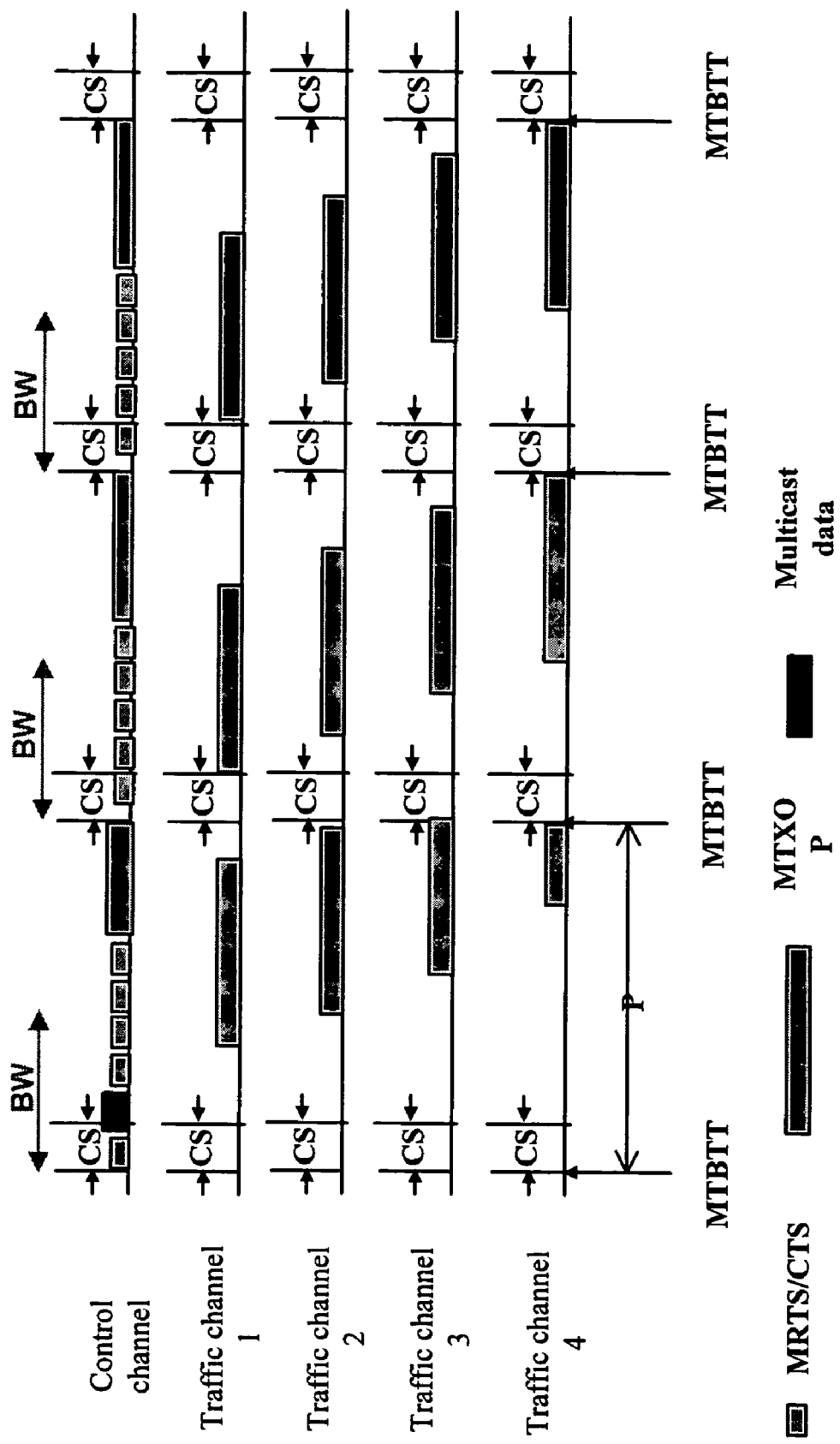
FIG. 8 shows a single-radio network environment having short multicast traffic transmitted on the control channel.

FIG. 8 shows a timing diagram for a network having single-radio nodes wherein a short multicast is transmitted on the control channel. It can be seen that the multicast data is transmitted first, then followed by traffic transmission on the remaining data channels and on the control channel.

Figure 9:
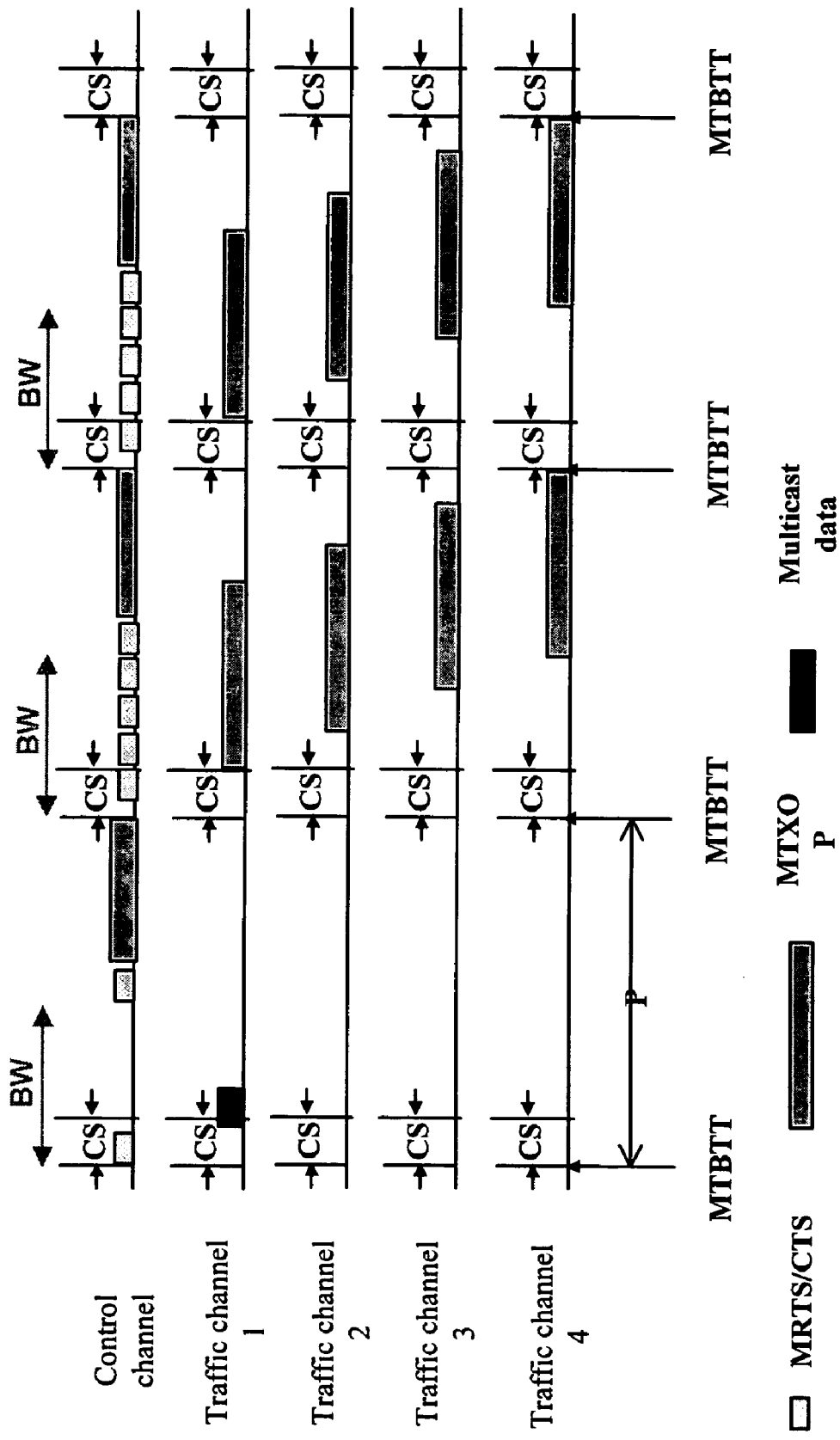
FIG. 9 shows a single-radio network environment having short multicast traffic transmitted on a traffic channel.

FIG. 9 shows a timing diagram for a network having single-radio nodes wherein a short multicast is transmitted on a traffic channel. Again, the multicast data is transmitted first, then followed by data transmission on the control channel in the same period and on data channels during the next periods.

Figure 10:
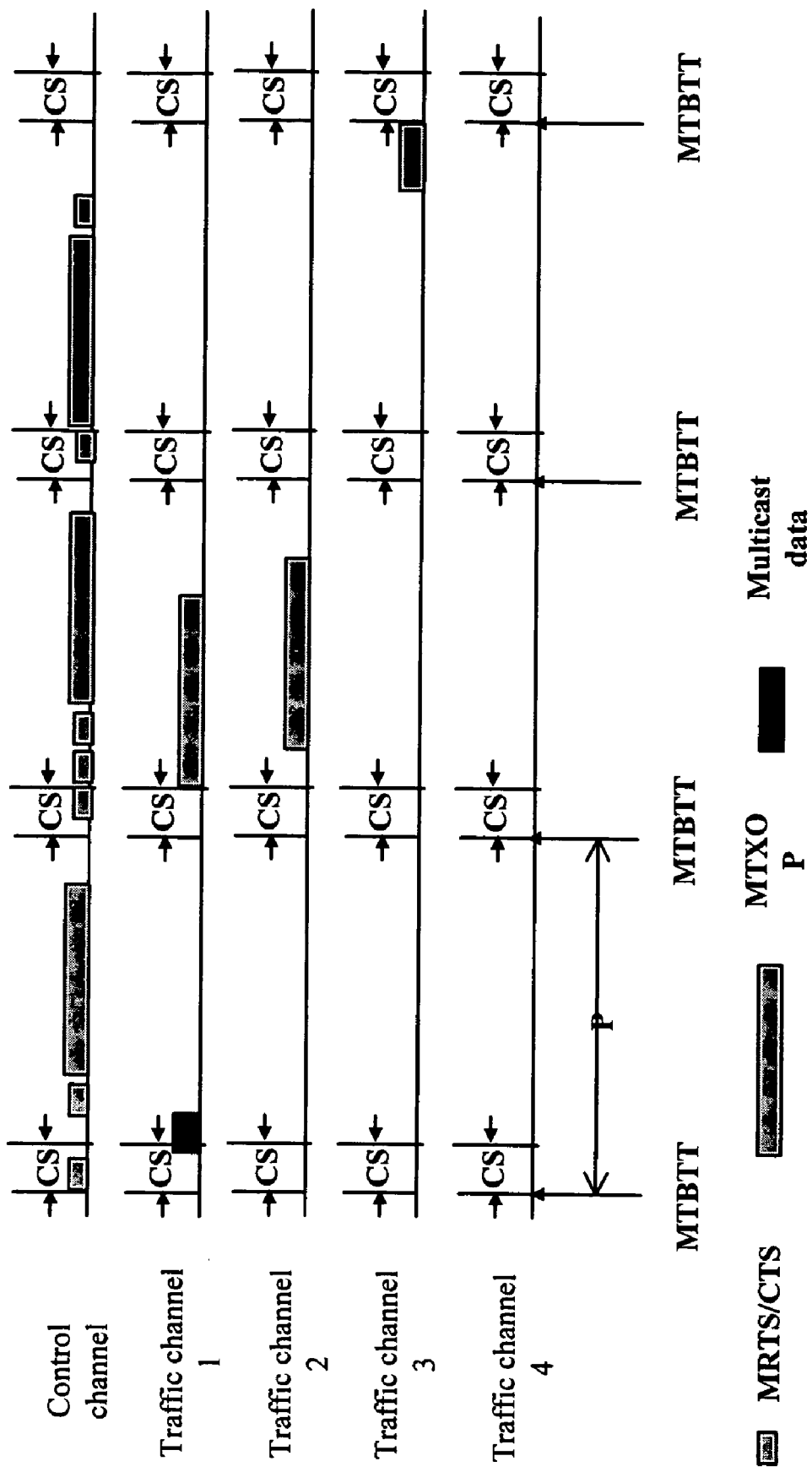
FIG. 10 shows a single-radio network environment having short multicast traffic transmitted on a traffic channel.

FIG. 10 shows a timing diagram for a network having single-radio nodes wherein a short multicast is transmitted on a traffic channel without the use of the BW (the window of time where only reservations for MT channels are permitted on the control channel). Again, the multicast data is transmitted first, then followed by data transmission on the control channel in the same period and on data channels during the following periods.

Figure 11:
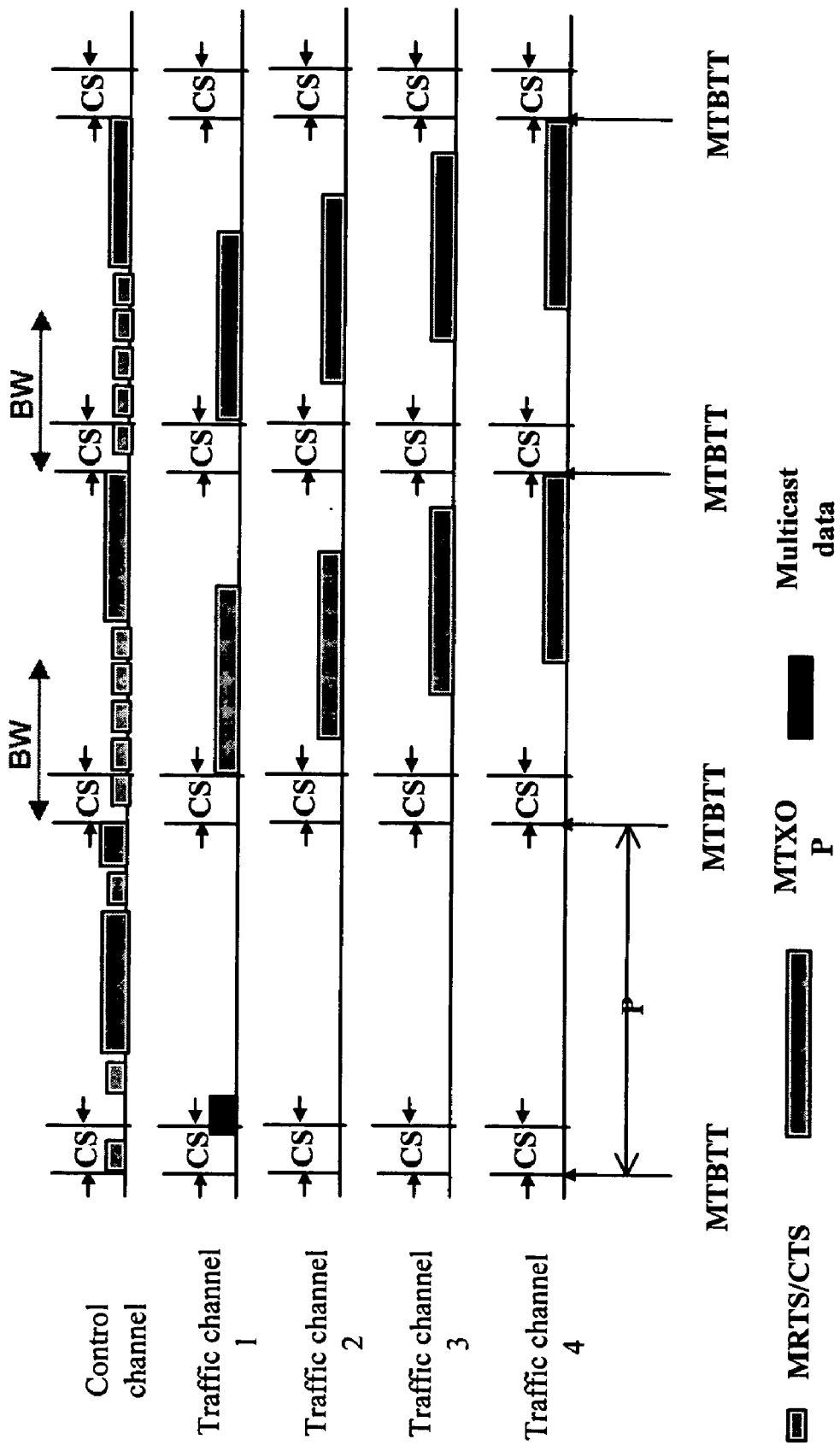
FIG. 11 shows a single-radio network environment having short multicast traffic transmitted on a traffic channel.

FIG. 11 shows a timing diagram for a network having single-radio nodes wherein a short multicast is transmitted on a traffic channel with the use of an adjustable BW. The multicast data is transmitted first, then followed by data transmission on the control channel in the same period and on data channels during the following periods.

Figure 12:
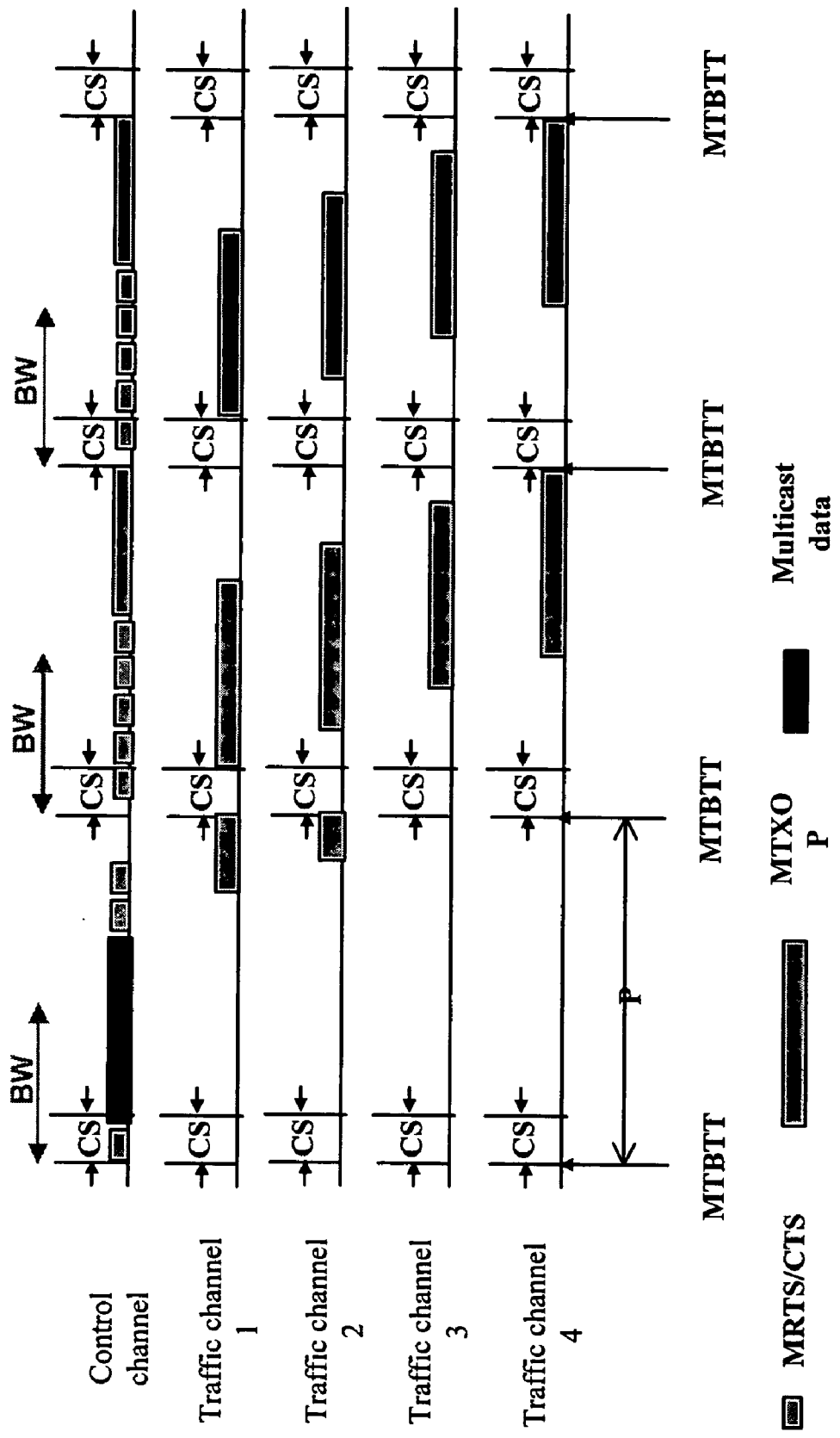
FIG. 12 shows a single-radio network environment having long multicast traffic transmitted on the control channel.

FIG. 12 shows a timing diagram for a network having single-radio nodes wherein a long multicast is transmitted on a traffic channel with the use of a BW. The multicast data is transmitted first, then followed by data transmission on the traffic channels in the same period and on the control channel and data channels during the following periods. Because the long broadcast/multicast is performed on the control channel, the remaining nodes cannot reserve data channels until after the multicast/broadcast transmission completes.

Figure 13:
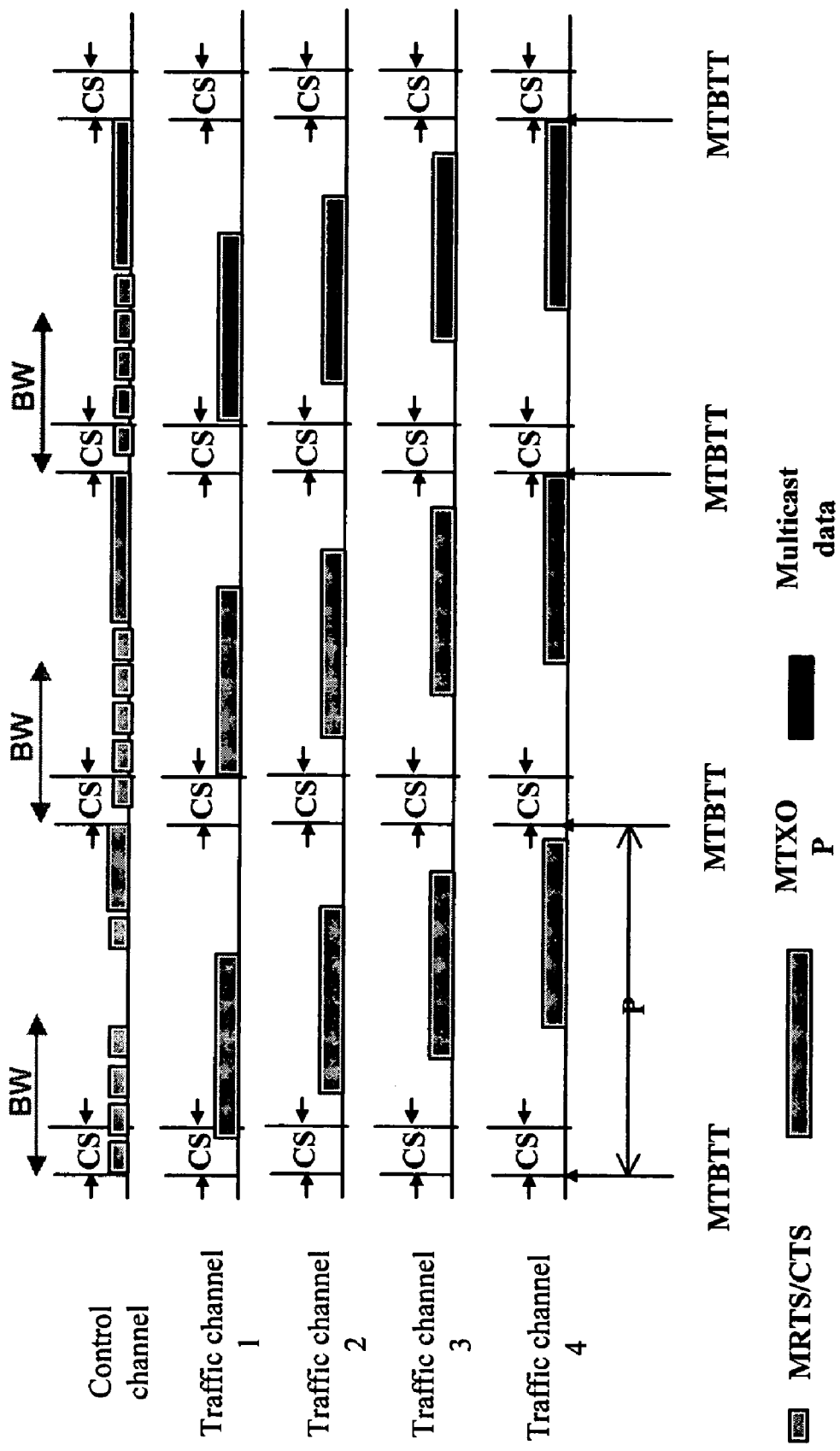
FIG. 13 shows a single-radio network environment having long unicast traffic transmitted on a traffic channel.

FIG. 13 shows a timing diagram for a network having single-radio nodes wherein a long unicast is transmitted on a traffic channel with the use of a BW. Other unicast transmissions occur on the control channel and on traffic channels.

Figure 14:
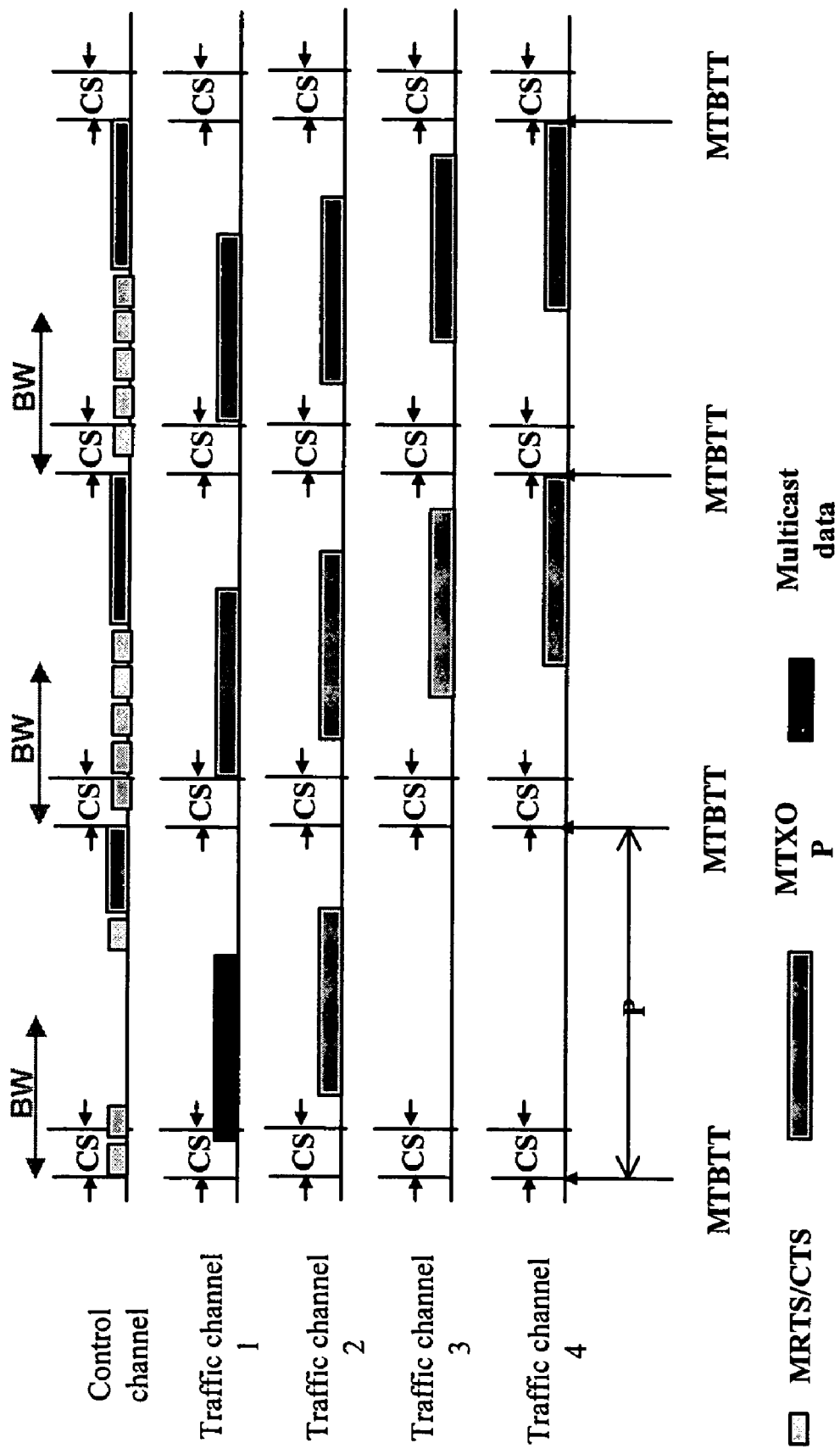
FIG. 14 shows a single-radio network environment having long multicast traffic transmitted on a traffic channel.

FIG. 14 shows a timing diagram for a network having single-radio nodes wherein a long multicast is transmitted on a traffic channel with the use of a BW. The multicast data is transmitted first, then followed by data transmission on the control channel and data channels in the same period and on the control channel and data channels during the following periods. Data traffic can occur on another traffic channel while the multicast data is being transmitted on a particular traffic channel.

Figure 15:
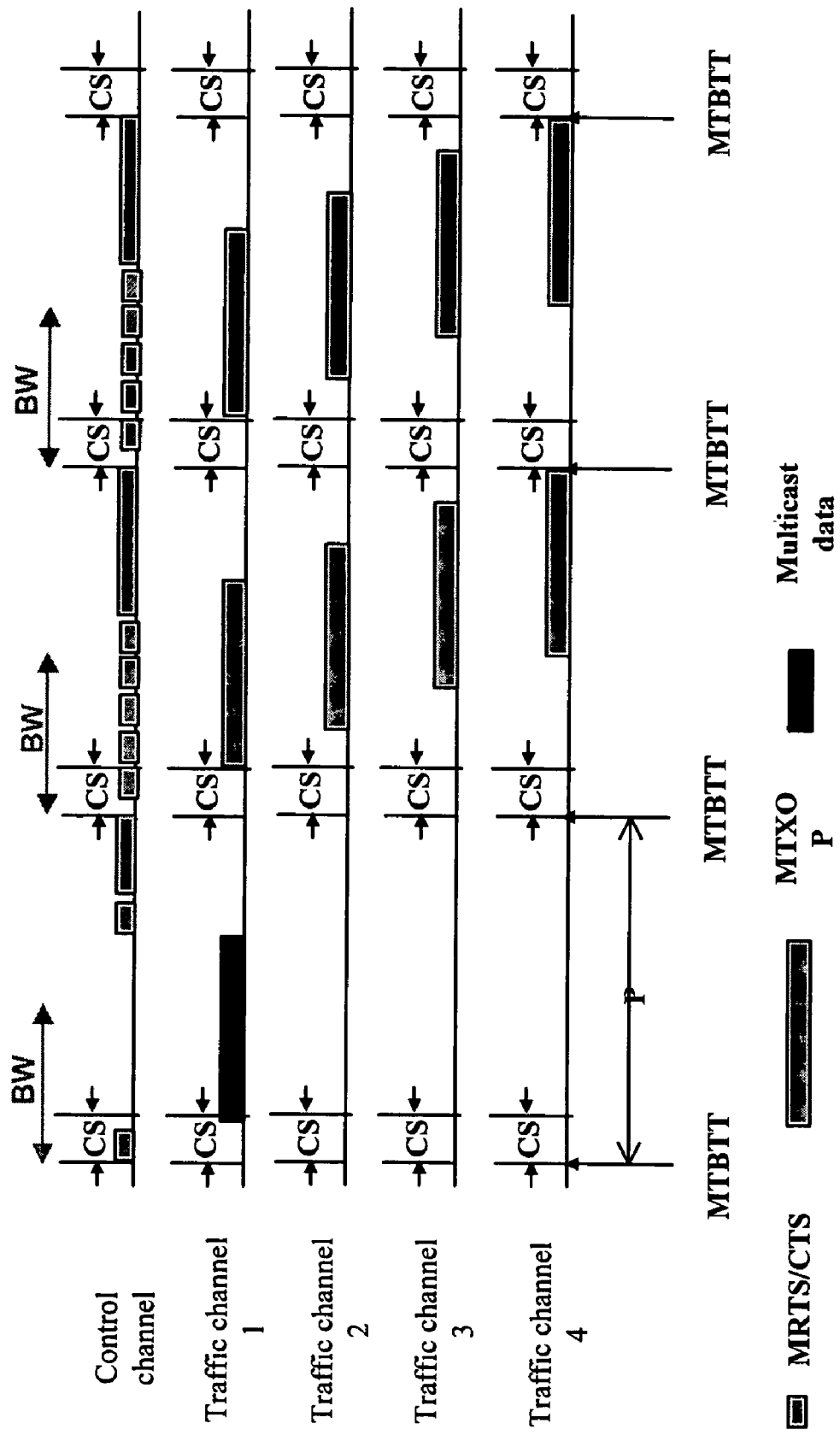
FIG. 15 shows a single-radio network environment having long unicast traffic transmitted on a traffic channel.

FIG. 15 shows a timing diagram for a network having single-radio nodes wherein a long broadcast is transmitted on a traffic channel with the use of a BW. The broadcast data is transmitted first, then followed by data transmission on the control channel and data channels during the following periods.

For unicast data, nodes are expected to hear a reservation if they have not retuned radio for another transmission since the last MTBTT. A reservation for unicast data is made with CC-RTS/CC-CTS on control channel. Acknowledgements for single-radio nodes occur either on traffic channel or on control channel (CC-ACK), and acknowledgements for multi-radio nodes occur on control channel (CC-ACK).

For the network having single-radio nodes, one broadcast/multicast MXTOP per period is performed. All nodes hear the reservation, as the first MTXOP after MTBTT is for broadcast/multicast data. A reservation request is achieved with a CC-RTS addressed a group, no CC-CTS response required. The destination address indicates either a group of nodes (multicast) or all the nodes associated with the network (broadcast). No acknowledgement is required BW is the window (a time period) where only reservations for MT channels are permitted on the control channel. The transmission of data on the control channel is limited outside BW. nodes involved in a broadcast/multicast on a MT channel are not allowed to use MT channels until after next MTBTT. Such nodes can access the control channel, but only outside BW. To increase their access to a channel, such nodes can ignore BW in the period in which they are involved in a broadcast/multicast.

Table 2 shows the preferred channel to use for data transmission depending on the type of data, the number of radios at the nodes, and the length of the data transmission.

TABLE 2

| | | MTXOP Length | |
| --- | --- | --- | --- |
| Distribution | # Radios | Long | Short |
| Unicast/ multicast | 1 | MT channel | Control channel |
| Broadcast | 1 | Control channel | Control channel |

A mixed network includes both single-radio nodes and multi-radio nodes. nodes may broadcast/multicast data on the control channel or on a shared MT channel (channel accessible by both single-radio and multi-radio nodes). All nodes release control channel at MTBTT. At MTBTT, nodes reset NAV of the common control channel to zero. All nodes release any shared MT channels at MTBTT. All single-radio nodes release all MT channels at MTBTT. At MTBTT, single-radio nodes reset NAVs of released MT channels to CS. A single-radio node shall not transmit a MTXOP containing data traffic on the control channel during a window BW immediately following MTBTT. All nodes can hear the broadcast/multicast reservation. The reservation for a broadcast/multicast will be made before any single-radio node reservations for MT channels.

When broadcast/multicast is transmitted on control channel, multi-radio nodes may reserve MT channels any time, single-radio nodes may reserve MT channels after broadcast/multicast ends. To transmit broadcast/multicast on a shared MT channel, all nodes must have one MT radio available. A single-radio node does not transmit at the time of a broadcast/multicast reservation. A multi-radio node may do one of the following: if all MT radios of a multi-radio node are busy, the transmission on one MT radio must complete by MTBTT, or the MTXOP on one MT radio of a multi-radio node is interrupted when a broadcast/multicast reservation involving the node is made Following the reservation, nodes involved in broadcast/multicast tune a radio to selected MT channel. Multi-radio nodes may reserve MT channels any time. Single-radio nodes not involved in a multicast may reserve MT channels after multicast ends. Single-radio nodes involved in multicast may not reserve MT channels before next MTBTT.

Table 3 shows the preferred channel to use for data transmission depending on the type of data, the number of radios at the nodes, and the length of the data transmission.

TABLE 3

| Distribution | # Radios | MTXOP Length | |
| --- | --- | --- | --- |
| | | Long | Short |
| Unicast | any | MT channel | Control channel |
| Broadcast/multicast | any | MT channel or control channel | Control channel |

Flow charts of particular embodiments of the presently disclosed methods are depicted in FIGS. 16-19. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 16:
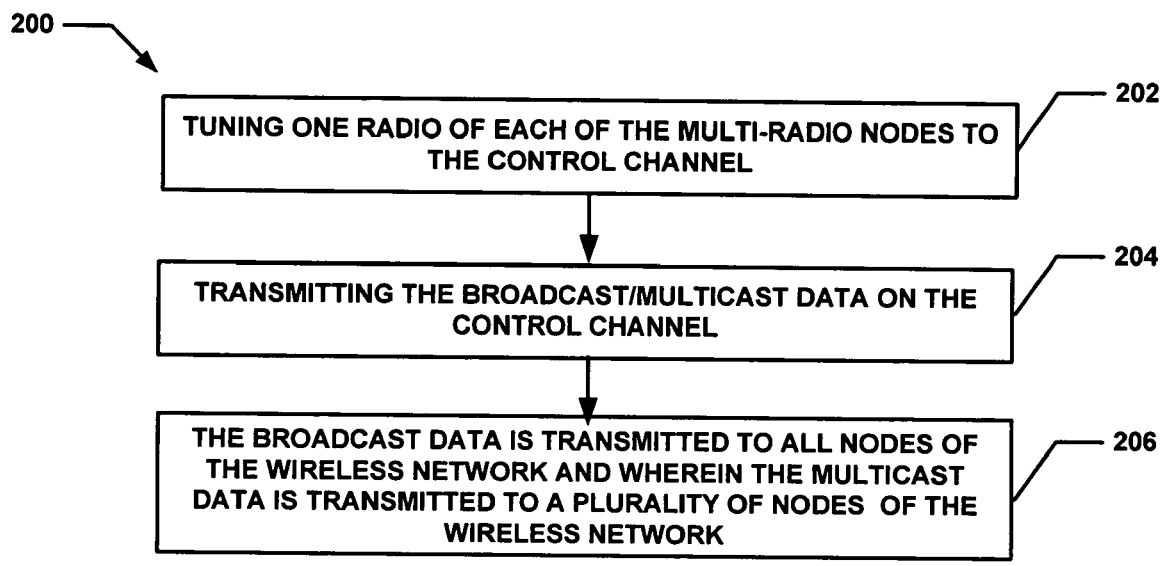
FIG. 16 shows a flow diagram of a first particular embodiment of method of transmitting multicast/broadcast data in a network having multi-radio nodes.

Referring now to FIG. 16, a method 200 of transmitting broadcast/multicast data in a wireless network including a plurality of multi-radio nodes, the wireless network having a control channel and at least one data channel is shown. The method begins with processing block 202 which discloses tuning one radio of each of the multi-radio nodes to the control channel.

Processing block 204 states transmitting the broadcast/multicast data on the control channel. Processing block 206 recites the broadcast data is transmitted to all nodes of the wireless network and wherein the multicast data is transmitted to a plurality of nodes of the wireless network.

Figure 17:
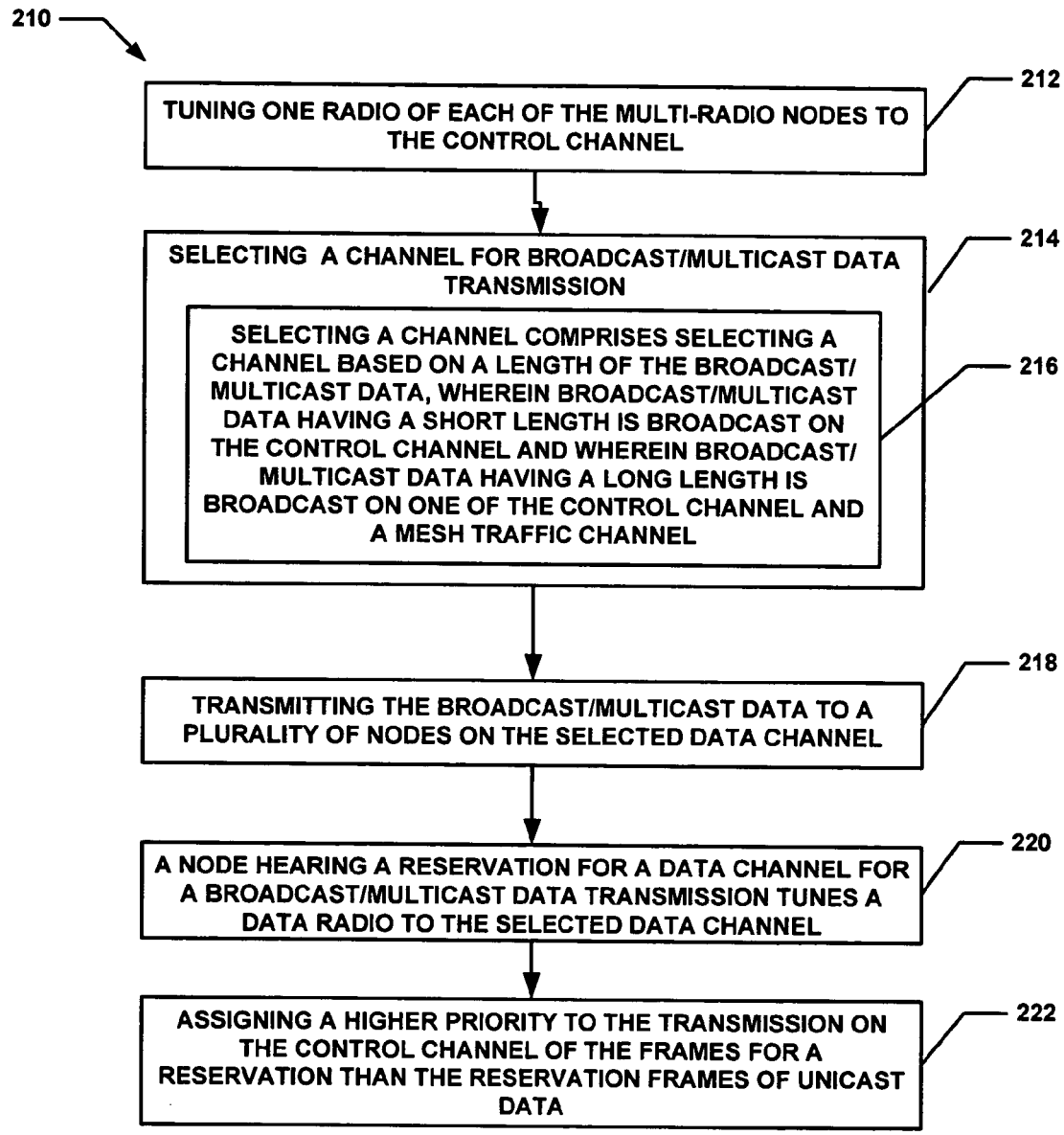
FIG. 17 shows a flow diagram of a second particular embodiment of method of transmitting multicast/broadcast data in a network having multi-radio nodes.

Referring now to FIG. 17, a method 210 of transmitting broadcast/multicast data in a wireless network including a plurality of multi-radio nodes, the wireless network having a control channel and at least one data channel is shown. The method begins with processing block 212 which discloses tuning one radio of each of the multi-radio nodes to the control channel.

Processing block 214 recites selecting a channel for broadcast/multicast data transmission. This may include, as recited in processing block 216 selecting a channel based on a length of the broadcast/multicast data, wherein broadcast/multicast data having a short length is broadcast on the control channel and wherein broadcast/multicast data having a long length is broadcast on one of the control channel and a data channel.

Processing continues with processing block 218 which discloses transmitting the broadcast/multicast data on the selected channel. Processing block 220 states a node hearing a reservation for a data channel for a broadcast/multicast data transmission tunes a data radio to the selected data channel. Processing block 222 recites assigning a higher priority to the transmission on the control channel of the frames for a reservation than the reservation frames of unicast data.

Figure 18A:
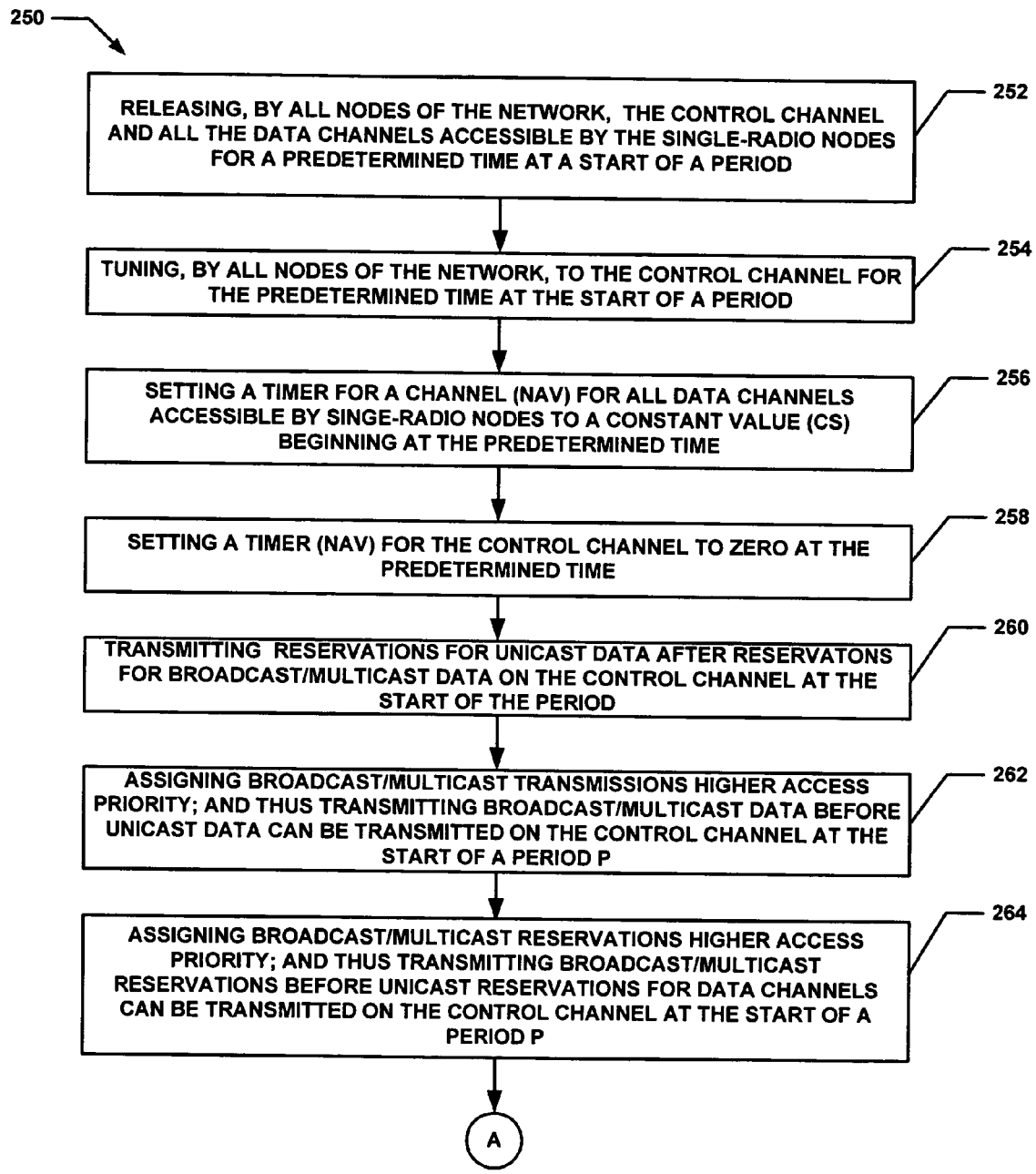
FIGS. 18A and 18B shows a flow diagram of a particular embodiment of method of transmitting multicast broadcast data in a network having single-radio nodes.
Figure 18B:
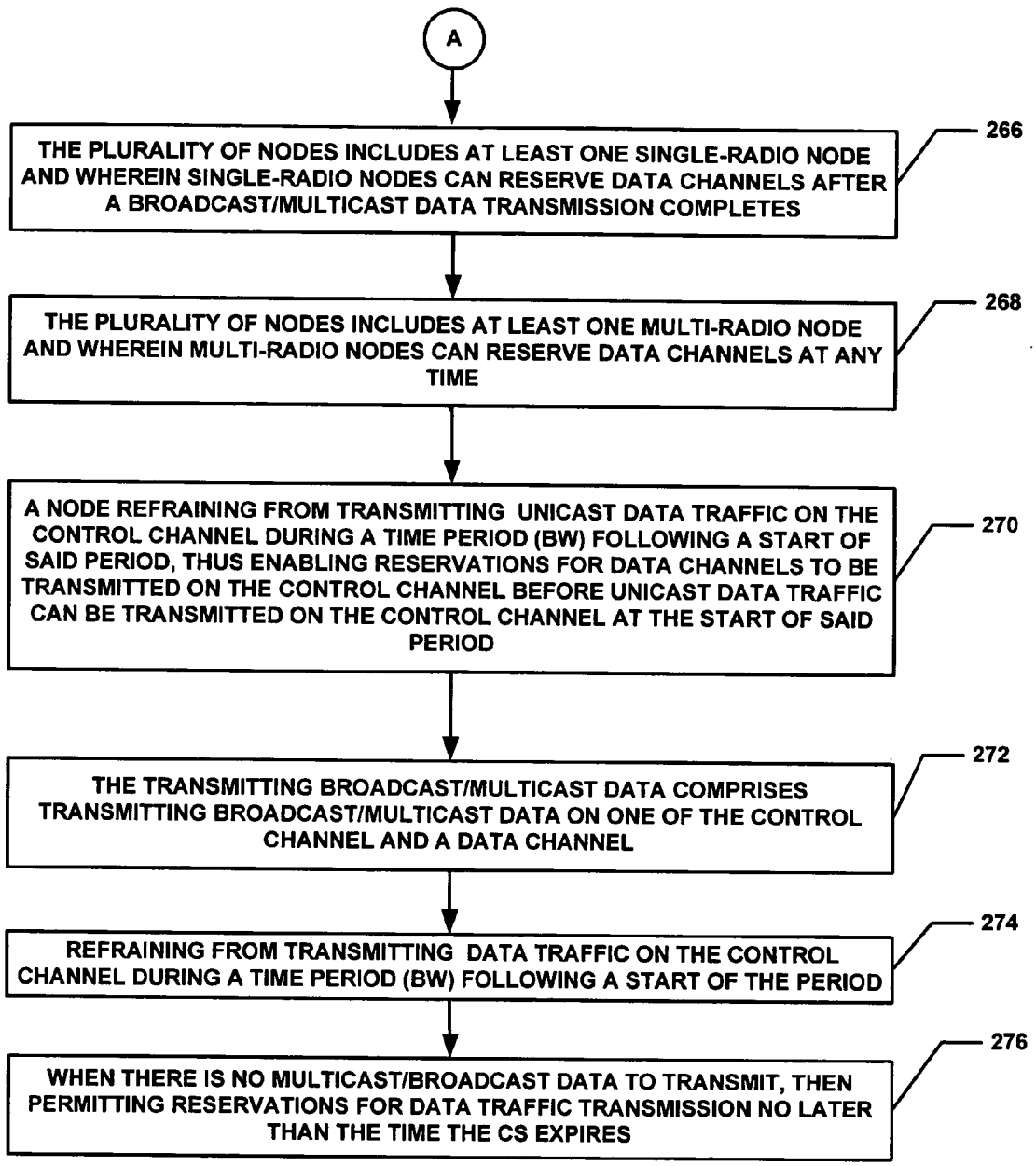

Referring now to FIGS. 18A and 18B, a particular embodiment of a method 250 of providing broadcast/multicast data in a wireless network including a plurality of single-radio nodes, the wireless network having a control channel and at least one data channel, is shown. Processing begins with processing block 252 which discloses releasing, by all nodes of the network, the control channel and all the data channels accessible by the single-radio nodes for a predetermined time at a start of a period.

Processing block 254 states tuning, by all nodes of the network, to the control channel for the predetermined time at the start of a period. This is followed by processing block 256 which recites setting a timer for a channel (NAV) for all data channels accessible by single-radio nodes to a constant value (CS) beginning at the predetermined time. Processing block 258 discloses setting a timer (NAV) for the control channel to zero at the predetermined time.

Processing continues with processing block 260 which shows transmitting reservations for unicast data after reservations for broadcast/multicast data on the control channel at the start of the period.

Processing block 262 discloses assigning broadcast/multicast transmissions higher access priority, and thus transmitting broadcast/multicast data before unicast data can be transmitted on the control channel at the start of a period P.

Processing block 264 states assigning broadcast/multicast reservations higher access priority, and thus transmitting broadcast/multicast reservations before unicast data can be transmitted on the control channel at the start of a period P.

Processing block 266 discloses the plurality of nodes includes at least one single-radio node and wherein the single-radio nodes can reserve data channels after a broadcast/multicast transmission completes. Processing block 268 discloses the plurality of nodes includes at least one multi-radio node and wherein the multi-radio node can reserve a data channel at any time.

Processing block 270 recites a node refraining from transmitting unicast data traffic on the control channel during a time period (BW) following a start of said period, thus enabling reservations for data channels to be transmitted on the control channel before unicast data traffic can be transmitted on the control channel at the start of said period.

As described in processing block 272 the transmitting broadcast/multicast data comprises transmitting broadcast/multicast data on one of the control channel and a data channel.

Processing block 274 discloses a node refraining from transmitting data traffic on the control channel during a time period (BW) following a start of the period. Processing block 276 states when there is no multicast/broadcast data to transmit, then permitting reservations for data traffic transmission beginning after the CS expires.

Figure 19:
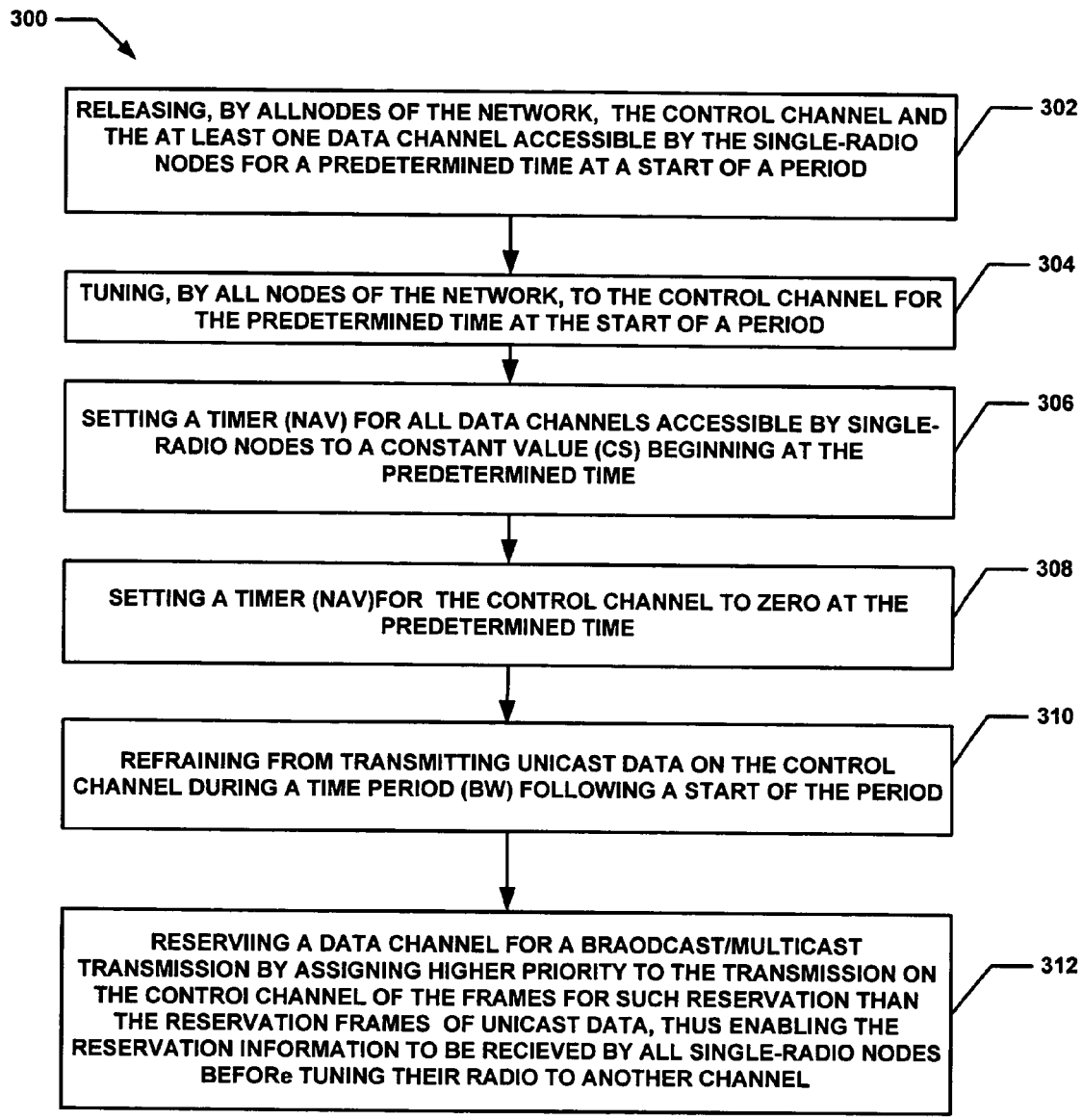
FIG. 19 shows a flow diagram of a particular embodiment of method of transmitting multicast/broadcast data in a network having multi-radio nodes and single-radio nodes.

Referring now to FIG. 19, a particular embodiment of a method 300 of providing broadcast/multicast data in a wireless network including a mix of single-radio nodes and multi-radio nodes, the wireless network having a control channel and at least one data channel, is shown. Processing begins with processing block 302 which discloses releasing, by all nodes of the network, the control channel and the at least one data channel for a predetermined time at a start of a period.

Processing block 302 states tuning, by all nodes of the network, to the control channel for the predetermined time at the start of a period. This is followed by processing block 304 which recites setting a timer for a channel (NAV) which, if set, prevents the node from transmitting on the channel, of all of the data channels accessible by single-radio nodes to a constant value (CS) beginning at the predetermined time. Processing block 308 discloses setting a timer for a channel (NAV) which, if set, prevents the node from transmitting on the channel, of the control channel to zero at the predetermined time.

Processing continues with processing block 310 which discloses a node refraining from transmitting unicast data on the control channel during a time period (BW) following a start of the period. Processing block 312 recites reserving a data channel for a broadcast/multicast transmission by assigning higher priority to the transmission on the control channel of the frames for such reservation than the reservation frames of unicast data. This enables the reservation information to be received by all single-radio nodes before tuning their radio to another channel.

Figure 20:
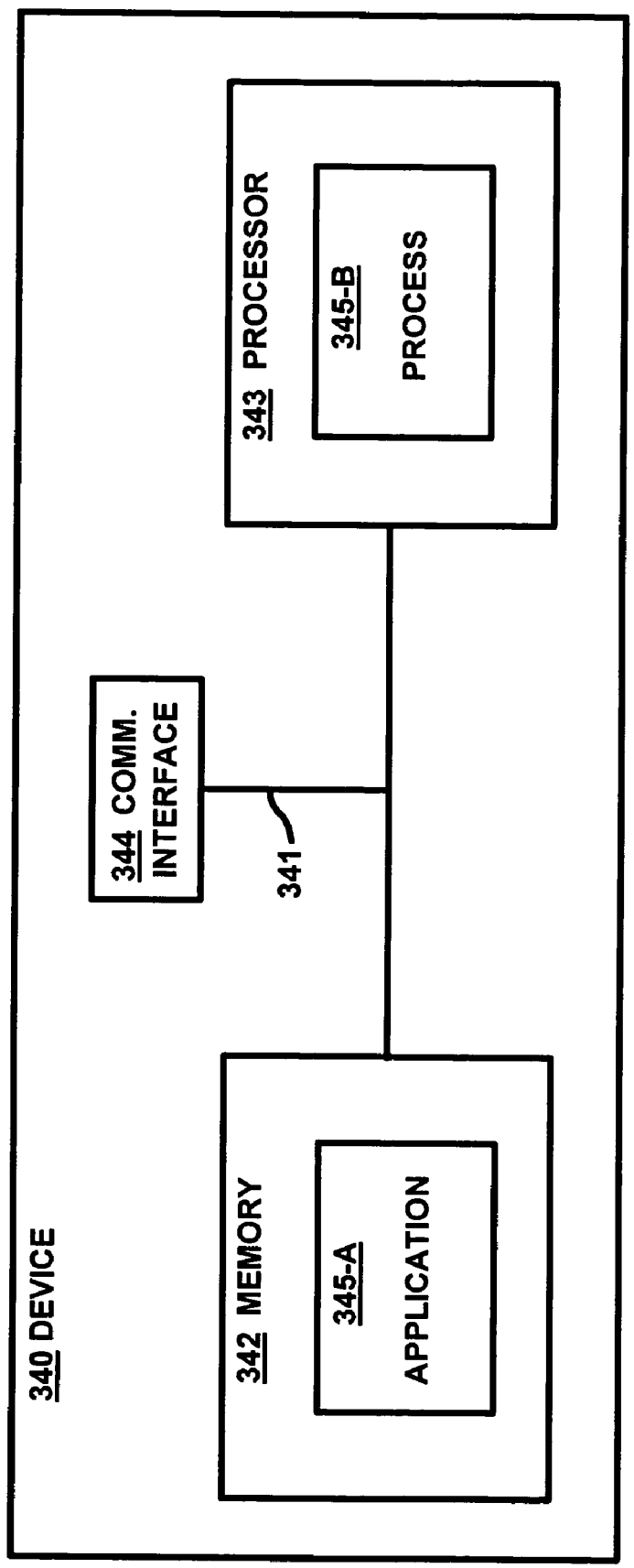
FIG. 20 illustrates an example computer system architecture for a node that performs transmitting of broadcast/multicast data in a wireless network in accordance with embodiments of the invention.

FIG. 20 illustrates example architectures of a computer system 340 that is configured as a node (single-radio or multi-radio). The node 340 may be any type of computerized system such as a personal computer, workstation, portable computing device, mainframe, server or the like. In this example, the system includes an interconnection mechanism 341 that couples a memory system 342, a processor 343, and a communications interface 344. The communications interface 344 allows the computer system 340 to communicate with external devices or systems.

The memory system 342 may be any type of computer readable medium that is encoded with an application 345-A that represents software code such as data and/or logic instructions (e.g., stored in the memory or on another computer readable medium such as a disk) that embody the processing functionality of embodiments of the invention as explained above. The processor 343 can access the memory system 342 via the interconnection mechanism 341 in order to launch, run, execute, interpret or otherwise perform the logic instructions of the applications 345-A in order to produce a corresponding process 345-B. In other words, the process 345-B represents one or more portions of the application 345-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of transmitting broadcast/multicast data in a wireless network including a plurality of multi-radio nodes, the wireless network having a control channel and at least one data channel, the method comprising:
   tuning one radio of each of said multi-radio nodes to the control channel;
   transmitting one of the group consisting of broadcast data and multicast data on said control channel to a plurality of nodes, wherein said control channel is normally used for making time reservations on data channels and wherein said data channels are normally used to transmit data traffic, wherein said broadcast data and said multicast data are not used for making time reservations on data channels; and
   assigning higher priority to data transmission on the control channel of the frames for a reservation than the reservation frames of unicast data.

2. The method of claim 1 wherein said broadcast data is transmitted to all nodes of the wireless network and wherein said multicast data is transmitted to a plurality of nodes of the wireless network.

3. A method of providing one of the group consisting of broadcast data and multicast data in a wireless network including a plurality of nodes, the wireless network having a control channel and at least one data channel, wherein said plurality of nodes includes at least one single-radio node, the method comprising:
   releasing, by all nodes of the network, the control channel and all the data channels accessible by single-radio nodes for a predetermined time at a start of a period;
   tuning, by all nodes of the network, to the control channel for the predetermined time at the start of a period;
   assigning one of the group consisting of broadcast data and multicast data transmissions higher access priority; and thus transmitting broadcast/multicast data before unicast data can be transmitted on the control channel at the start of a period P; and
   assigning one of the group consisting of broadcast data and multicast data reservations higher access priority; and thus transmitting broadcast/multicast reservations before unicast reservations for data channels can be transmitted on the control channel at the start of a period P, wherein said control channel is normally used for making time reservations on data channels and wherein said data channels are normally used to transmit data traffic, wherein said broadcast data and said multicast data are not used for making time reservations on data channels.

4. The method of claim 3 wherein said prioritization of reservations for one of the group consisting of broadcast data and multicast data reservations involves setting a timer (NAV)

for all data channels accessible by single-radio nodes to a constant value (CS) beginning at the predetermined time;
setting a timer (NAV) for the control channel to zero at the predetermined time; and
transmitting reservations for unicast data after reservations for broadcast/multicast data on the control channel at the start of said period.

5. The method of claim 3 wherein said plurality of nodes includes at least one single-radio node and wherein single-radio nodes can reserve data channels after a broadcast/multicast data transmission completes.

6. The method of claim 3 wherein said plurality of nodes includes at least one multi-radio node and wherein said multi-radio node can reserve a data channel at any time.

7. The method of claim 3 wherein said transmitting broadcast/multicast data comprises transmitting broadcast/multicast data on one of the control channel or a data channel.

8. The method of claim 7 wherein, when there is no one of the group consisting of broadcast data and multicast data to transmit, then permitting reservations for data traffic transmission no later than the time CS expires.

9. The method of claim 3 further comprising a node refraining from transmitting unicast data traffic on the control channel during a time period (BW) following a start of said period, thus enabling reservations for data channels to be transmitted on the control channel before unicast data traffic can be transmitted on the control channel at the start of said period.

10. The method of claim 3 wherein each period has a starting point, a time period of a predetermined constant value (CS) and a BW time period comprising a window of time where only reservations for data channels are permitted on the control channel.

11. A non-transitory computer readable medium having computer readable code thereon for transmitting one of the group consisting of broadcast data and multicast data in a wireless network including a plurality of multi-radio nodes, the wireless network having a control channel and at least one data channel, the computer readable medium comprising:
instructions for tuning one radio of each of said multi-radio nodes to the control channel;
instructions for transmitting the one of the group consisting of broadcast data and multicast data to a plurality of nodes on the control channel, wherein said control channel is normally used for making time reservations on data channels and wherein said data channels are normally used to transmit data traffic, wherein said broadcast data and said multicast data are not used for making time reservations on data channels; and
instructions for assigning higher priority to data transmission on the control channel of the frames for a reservation than the reservation frames of unicast data.

12. The computer readable medium of claim 11 wherein said broadcast data is transmitted to all nodes of the wireless network and wherein said multicast data is transmitted to a plurality of nodes of the wireless network.

13. A non-transitory computer readable medium having computer readable code thereon for transmitting one of the group consisting of broadcast data and multicast data in a wireless network including a plurality of multi-radio nodes, the wireless network having a control channel and at least one data channel, the computer readable medium comprising:
instructions for tuning one radio of each of said multi-radio nodes to the control channel;
instructions for selecting a data channel for one of the group consisting of broadcast data and multicast data transmission, wherein said instructions for selecting a channel comprises instructions for selecting a channel based on a length of the broadcast/multicast data, wherein broadcast/multicast data having a short length is broadcast on the control channel and wherein one of the group consisting of broadcast data and multicast data having a long length is broadcast on one of the control channel and a data channel; and
instructions for transmitting the one of the group consisting of broadcast data and multicast data to a plurality of nodes on the selected control channel, wherein said control channel is normally used for making time reservations on data channels and wherein said data channels are normally used to transmit data traffic, wherein said broadcast data and said multicast data are not used for making time reservations on data channels.

14. The computer readable medium of claim 13 further comprising instructions for wherein a node hearing a reservation for a data channel for one of the group consisting of broadcast data and multicast data transmission tunes a data radio to the selected data channel.

15. The computer readable medium of claim 13 further comprising instructions for assigning higher priority to the transmission on the control channel of the frames for a reservation than the reservation frames of unicast data.

16. A non-transitory computer readable medium having computer readable code thereon for transmitting one of the group consisting of broadcast data and multicast data in a wireless network including a plurality of nodes, the wireless network having a control channel and at least one data channel, wherein said plurality of nodes includes at least one single-radio node, the computer readable medium comprising:
instructions for releasing, by all nodes of the network, the control channel and all the data channels accessible by single-radio nodes for a predetermined time at a start of a period; instructions for tuning, by all nodes of the network, to the control channel for the predetermined time at the start of a period;
instructions for assigning one of the group consisting of broadcast data and multicast data transmissions higher access priority; and thus transmitting one of the group consisting of broadcast data and multicast data before unicast data can be transmitted on the control channel at the start of a period P; and
instructions for assigning one of the group consisting of broadcast data and multicast data reservations higher access priority; and thus transmitting one of the group consisting of broadcast data and multicast data reservations before unicast reservations for data channels can be transmitted on the control channel at the start of a period P, wherein said control channel is normally used for making time reservations on data channels and wherein said data channels are normally used to transmit data traffic.

17. The computer readable medium of claim 16 wherein said prioritization of reservations for one of the group consisting of broadcast data and multicast data reservations involves instructions for setting a timer (NAV) for all data channels accessible by single-radio nodes to a constant value (CS) beginning at the predetermined time;
instructions for setting a timer (NAV) for the control channel to zero at the predetermined time; and
instructions for transmitting reservations for unicast data after reservations for one of the group consisting of broadcast data and multicast data on the control channel at the start of said period.

18. The computer readable medium of claim 16 wherein said plurality of nodes includes at least one single-radio node and wherein single-radio nodes can reserve data channels after one of the group consisting of broadcast data and multicast data transmission completes.

19. The computer readable medium of claim 16 wherein said plurality of nodes includes at least one multi-radio node and wherein said multi-radio node can reserve a data channel at any time.

20. The computer readable medium of claim 16 wherein said instructions for transmitting one of the group consisting of broadcast data and multicast data comprises instructions for transmitting one of the group consisting of broadcast data and multicast data on one of the control channel or a data channel.

21. The computer readable medium of claim 16 further comprising instructions for a node refraining from transmitting unicast data traffic on the control channel during a time period (BW) following a start of said period, thus enabling reservations for data channels to be transmitted on the control channel before unicast data traffic can be transmitted on the control channel at the start of said period.

22. The computer readable medium of claim 21 wherein, when there is no one of the group consisting of broadcast data and multicast data to transmit, then permitting reservations for data traffic transmission no later than the time CS expires.

23. The computer readable medium of claim 16 wherein each period has a starting point, a time period of a predetermined constant value (CS) and a BW time period comprising a window of time where only reservations for data channels are permitted on the control channel.

\* \* \* \* \*